United States Patent [19]

Scherbatskoy

[11] 3,869,608

[45] Mar. 4, 1975

[54] NUCLEAR WELL LOGGING

[76] Inventor: Serge A. Scherbatskoy, 3517 W. Ridge Ave., Fort Worth, Tex.

[22] Filed: July 1, 1953

[21] Appl. No.: 365,499

Related U.S. Application Data

[63] Continuation-in-part of Ser. No. 119,601, Oct. 5, 1949, Pat. No. 2,648,012.

[52] U.S. Cl.................. 250/270, 250/262, 250/269, 250/361
[51] Int. Cl.............................................. G01v 5/00
[58] Field of Search ......... 250/71, 83.6, 83 A, 71.5, 250/83.3, 83.6, 262, 269, 270, 36.1

[56] References Cited
UNITED STATES PATENTS

| | | | |
|---|---|---|---|
| 2,275,748 | 3/1942 | Fearon | 250/83 C |
| 2,469,460 | 5/1949 | Fearon | 250/83.6 |
| 2,469,463 | 5/1949 | Russell | 250/83 C |
| 2,493,346 | 1/1950 | Herzog | 250/83.6 |
| 2,508,772 | 5/1950 | Pontecorvo | 250/83.6 |
| 2,550,107 | 4/1951 | Coltman | 250/71 |
| 2,686,266 | 8/1954 | Pringle et al. | 250/71.5 |
| 2,712,081 | 6/1955 | Fearon et al. | 250/83.6 W |

OTHER PUBLICATIONS

Electronic Classifying, Cataloging and Counting Systems, by Parsons, AECD-1827, Technical Information Div., Oak Ridge, Tenn., Mar. 25, 1948, pp. 1–15.

*Primary Examiner*—Archie R. Borchelt
*Attorney, Agent, or Firm*—Dugald S. McDougall; Richard R. Trexler

[57] ABSTRACT

This invention comprises apparatus for detecting the compositions of materials, and specifically for logging oil well bores. The apparatus comprises a neutron generator; a scintillation crystal responsive to gamma rays, slow neutrons and fast neutrons; and a photocell responsive to the scintillations of the crystal. Means is provided for amplifying, detecting, and recording the action of the photocell to provide recorded traces of the gamma rays, and slow and fast neutrons. Means is provided for calibrating the instrument from the ground surface.

23 Claims, 18 Drawing Figures

INVENTOR.
Serge A. Scherbatskoy
BY Mason, Kolehmainen,
Rathburn and Wyss
Att'ys

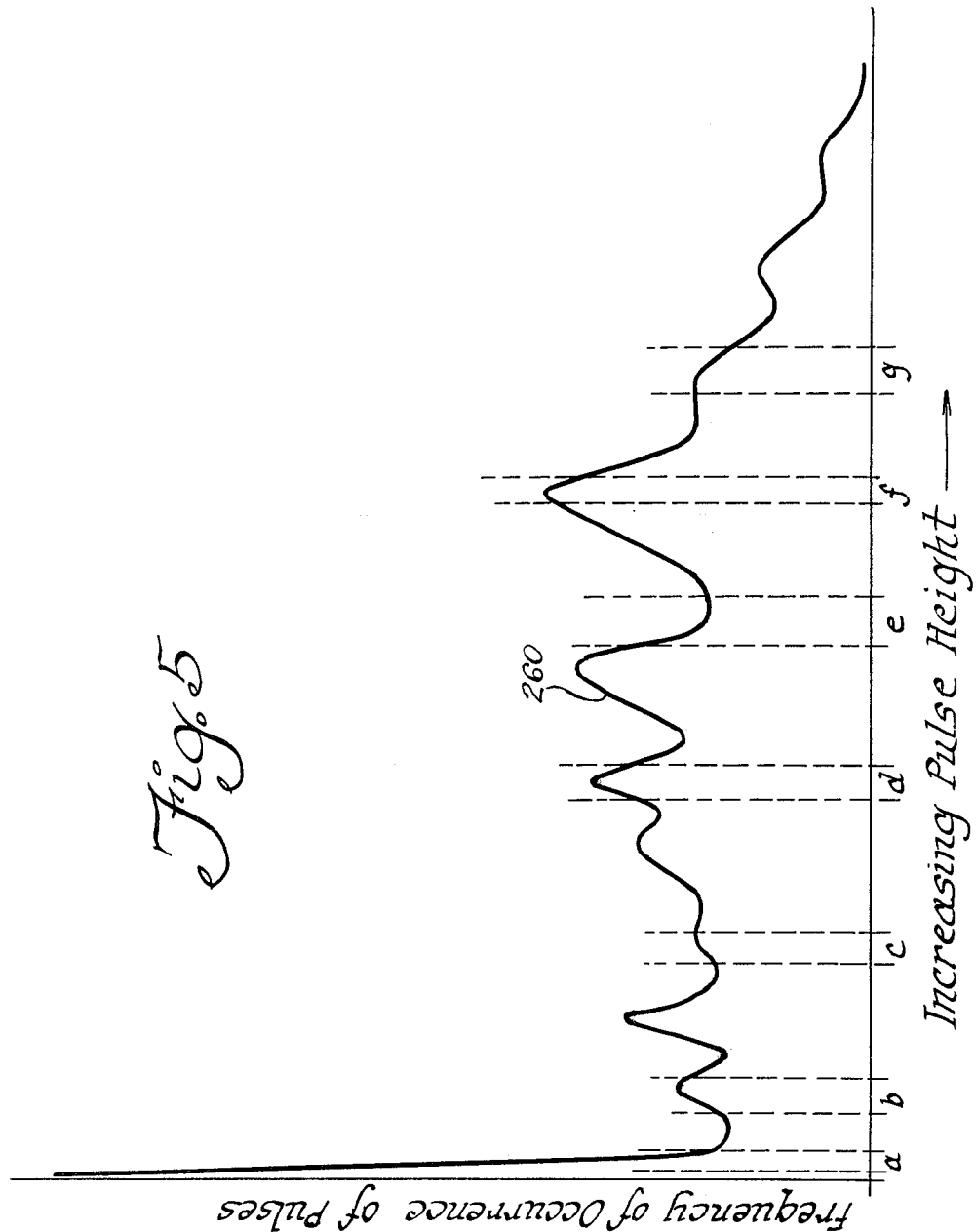

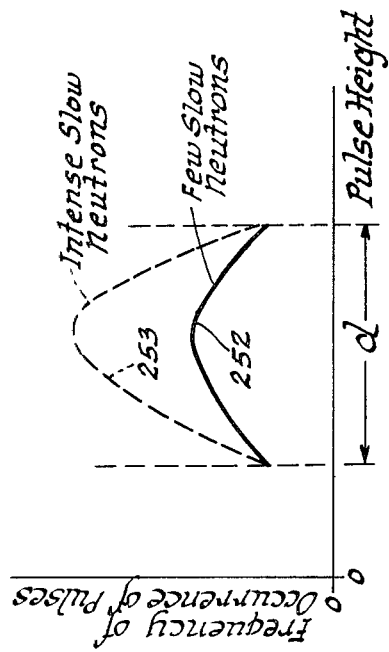
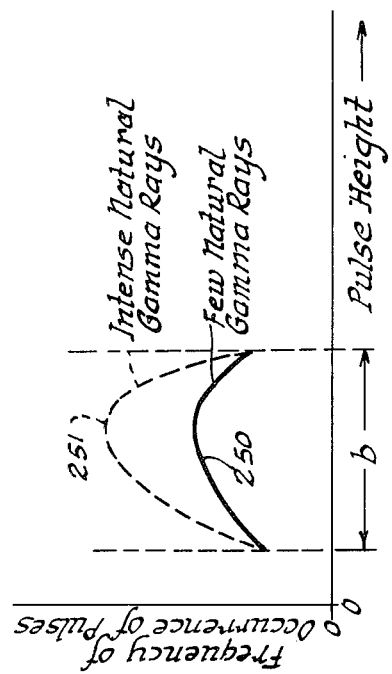
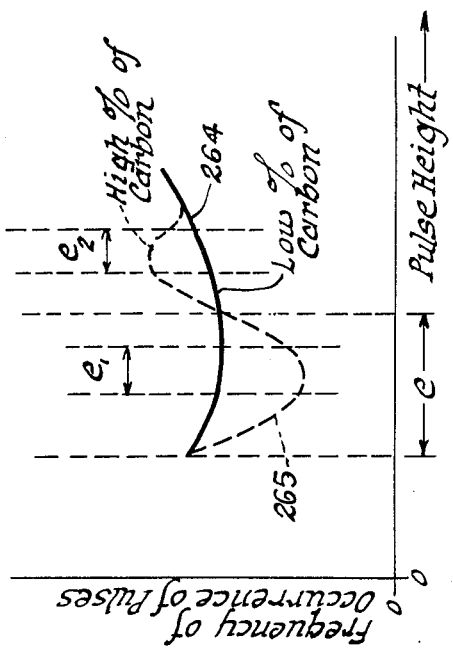
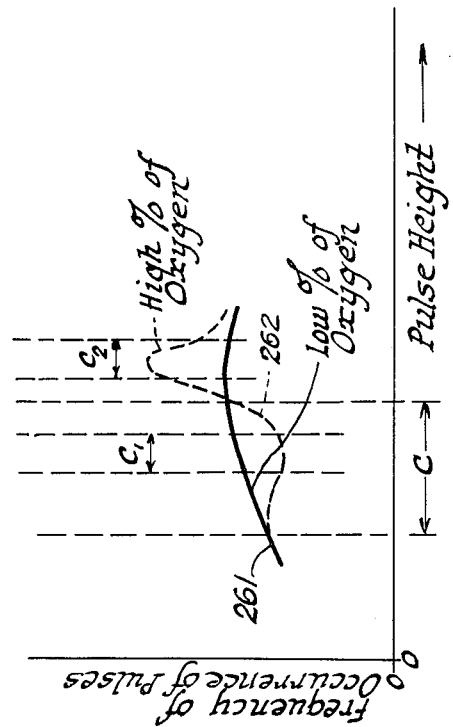

Fig. 15

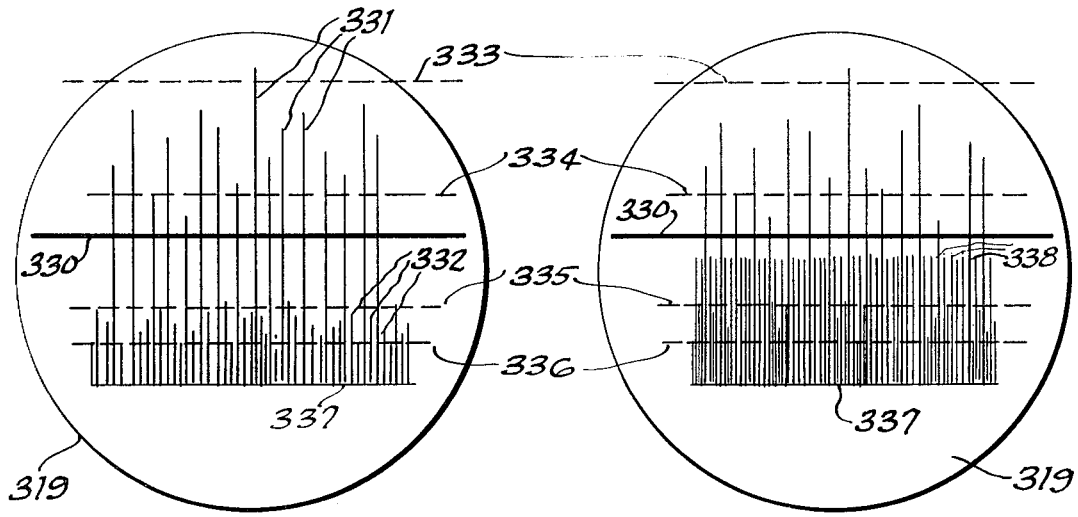

Fig. 16

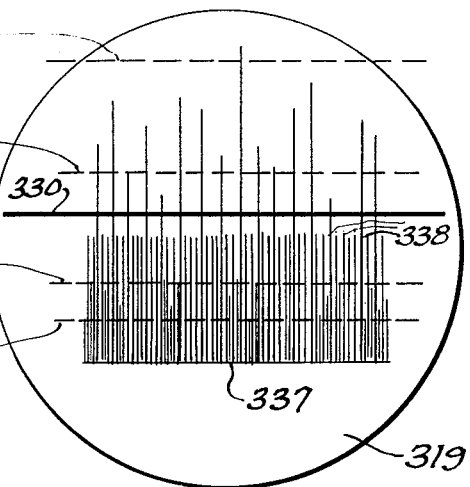

Fig. 17

| Combination Number | Natural Gamma Ray Log | Neutron - Slow Neutron Log | Selective Neutron - Fast Neutron Log | Interpretation |
|---|---|---|---|---|
| | Y=Shale or Radioactive Rock N=Lime or Sand | Y=Hydrogen N=No Hydrogen | Y=Carbon N=No Carbon | |
| 1 | Y | N | N | Rare (Radioactive Rock) |
| 2 | Y | N | N | Shale |
| 3 | Y | N | Y | Rare (Radioactive Rock) |
| 4 | Y | Y | Y | Shale |
| 5 | N | Y | Y | Oil in Sandstone |
| 6 | N | N | Y | Dry Limestone |
| 7 | N | Y | N | Water Sand |
| 8 | N | N | N | Dry Sand |

INVENTOR.
Serge A. Scherbatskoy
BY
Mason, Kolehmainen, Rathburn and Wyss
Atty's

NUCLEAR WELL LOGGING

Specifically, the present invention is a continuation-in-part of my copending application, Ser. No. 119,601, filed on Oct. 5, 1949, now U.S. Pat. No. 2,648,012.

The present invention relates to radioactivity well logging, and, more particularly, to methods of and apparatus for measuring within a bore hole radiations from the formations adjacent the bore hole. The measured radiations may arise naturally within the formations due to the natural radioactivity of the rocks, or the measured radiations may arise as a result of bombardment of the formations by a source of radiations, such as neutrons, which is moved through the bore hole in spaced relation to a suitable detecting instrument.

Many measurements may be made of radiations within the bore hole. These measurements can be broadly classified in four types that may be respectively designated as measurements of natural gamma radiation, measurements of gamma radiation due to neutron bombardment or gamma ray bombardment, measurements of slow neutrons and measurements of fast neutrons. In the measurements of the first type a gamma ray detector is employed by itself to measure the natural radioactivity of the rocks. In measurements of the second type a detector of gamma radiations accompanied by a source of neutrons is lowered into a bore hole in the earth and measurements are made at various depths of gamma radiations resulting from interaction of neutrons derived from said source with the adjoining formations. These measurements when correlated with depth provided a log commonly designated as a neutron-gamma ray log. In the measurements of the third type a detector of slow neutrons accompanied by a source of neutrons is lowered into a bore hole and the measurements obtained when correlated with depth provided a log commonly designated as a neutron-slow neutron log. In the measurements of the fourth type a detector of fast neutrons accompanied with a source of neutrons may, in accordance with the present invention, be lowered into a bore hole and the measurements obtained when correlated with depth will provide a log that we shall designate as a neutron-fast neutron log.

In order to obtain a neutron-gamma ray log and a neutron-slow neutron log of the same bore hole, two separate detector arrangements are conventionally required, one utilizing a gamma ray detector and the other utilizing a slow neutron detector. Neutron-fast neutron logs have not been known in the prior art because of the failure to measure fast neutrons without the background of gamma radiation. Furthermore, fast neutrons are extremely penetrating because they have no charge so that ordinary gas-filled radiation detectors of conventional design, in which the molecules of the gas are widely separated, are extremely inefficient in detecting fast neutrons. Actually, a conventional gas-filled counter has an efficiency of a very small fraction of 1 per cent in logging fast neutrons and the counter would have to be moved so slowly through the bore hole that it would take approximately 1 year to log a single well and provide useful fast neutron information.

In addition to removing the masking effects due to background gamma radiation when obtaining a fast neutron log, it is desirable to obtain a selective log of the absorption or attenuation of fast neutrons over a particular energy range. This is because certain elements exhibit abrupt changes in neutron cross section for neutrons of slightly different energies and the presence of these elements in the formations may be detected by obtaining selective logs of the formations for neutrons of these different energies. The elements carbon and oxygen are almost unique in this respect and hence these selective fast neutron logs can be employed to determine the presence of carbon, i.e., oil, or oxygen, i.e., water, in the formations and to distinguish between oil and water in fluid-bearing formations. However, in order to obtain selective fast neutron logs which may be interpreted with some degree of accuracy, it is necessary that the fast neutron detector be of relatively small dimensions. Otherwise, one end of the detector will be measuring fast neutrons of one energy and the other end of the detector will be measuring neutrons of a different energy and the selective absorption or attenuation of fast neutrons over a particular narrow energy range will be obscured. With a detector several feet in length, it is virtually impossible to obtain an accurate, selective fast neutron log.

It is, therefore, a primary object of the present invention to provide new and improved methods and apparatus for obtaining a neutron-fast neutron log of the formations adjacent a bore hole in the presence of undesired background radiations.

It is another object of the present invention to provide new and improved methods and apparatus for obtaining information pertaining to the lithologic structure of the formations adjacent a bore hole by means of a selective neutron-fast neutron log which is substantially unaffected by relatively strong background radiations.

It is still another object of the present invention to provide a new and improved neutron-fast neutron well logging system wherein means are provided for selecting only those fast neutrons having a predetermined relatively small range of energies and rejecting all other radiations having energies outside said range.

It is a further object of the present invention to provide a new and improved radioactivity well logging system whereby the presene of metals within the formations may be detected.

It is a still further object of the present invention to provide a new and improved radioactivity well logging system whereby the presence of oil within the formations may be detected directly.

Another object of the present invention resides in the provision of a new and improved radioactivity well logging system wherein a natural gamma ray log, a neutron-gamma ray of capture log and a neutron-slow neutron log may be obtained simultaneously in one pass through the bore hole and whereby the location of oil within the formations adjacent the bore hole may be detected directly.

A further object of the present invention resides in the provision of a new and improved radioactivity well logging system wherein the presence of oil within the formations adjacent the bore hole may be separately detected and accurately distinguished from the presence of water or other fluids within the bore hole.

Still another object of the present invention resides in the provision of a new and improved radioactivity well logging system wherein the ratio of carbon to oxygen content of the formations adjacent the bore hole may be obtained directly in one pass through the bore hole.

It is another object of the present invention to provide a new and improved radioactivity well logging system wherein a neutron-gamma ray of capture log, a neutron-slow neutron log and a selective neutron-fast neutron log may be obtained simultaneously in one pass through the bore hole and wherein all three logs are made of the identical formations at the same time, whereby the presence of oil within the formations may be detected directly.

It is still another object of the present invention to provide a new and improved radioactivity well logging system wherein the sensitivity of the system may be checked periodically by means of reference particles of known energy which may be selectively impressed upon the detector by means of apparatus controllable from the earth's surface.

It is a further object of the present invention to provide a new and improved radioactivity well logging system wherein two selective neutron-fast neutron logs may be obtained which are correlated with the neutron cross section characteristic of a particular element so that the presence of said particular element within the formations may be detected.

It is a still further object of the present invention to provide a new and improved radioactivity well logging system wherein the oil-water interface in fluid bearing strata may be accurately determined.

The invention, both as to its organization and method of operation, together with further objects and advantages thereof, will best be understood by reference to the following specification taken in connection with the accompanying drawings, in which :

FIG. 1 illustrates diagrammatically a bore hole which penetrates the strata of the earth, and the general arrangement for logging the bore hole in accordance with the principles of the present invention;

FIG. 1A more specifically illustrates a discharge tube neutron source;

FIG. 5 is a graph of pulse height versus pulse frequency of occurrence useful in understanding the invention;

Figure 1:
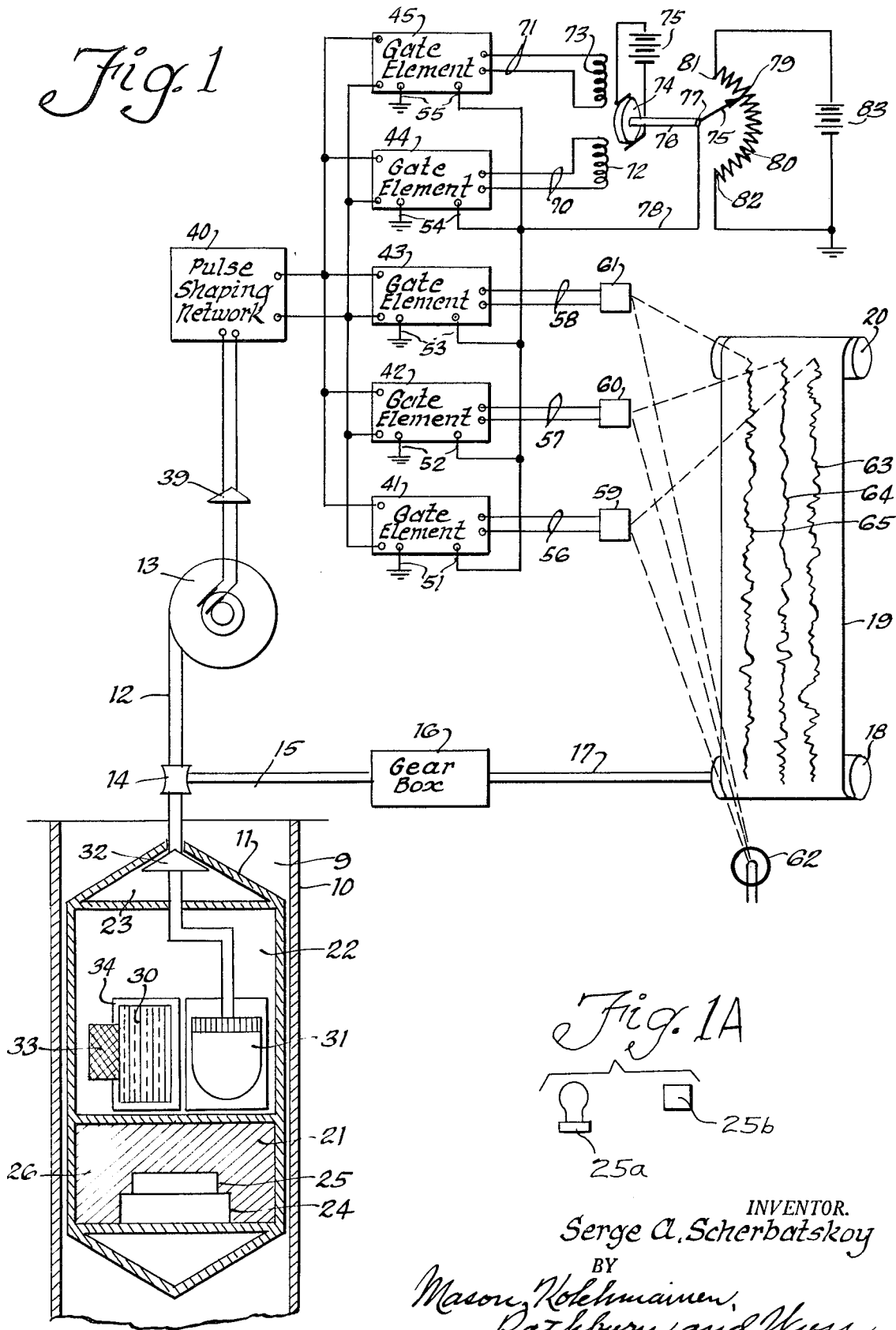
Figure 10:
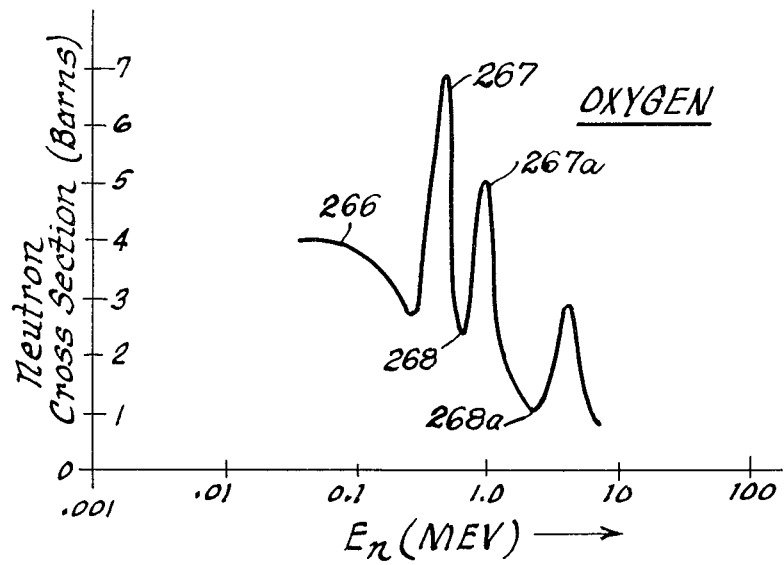
Figure 11:
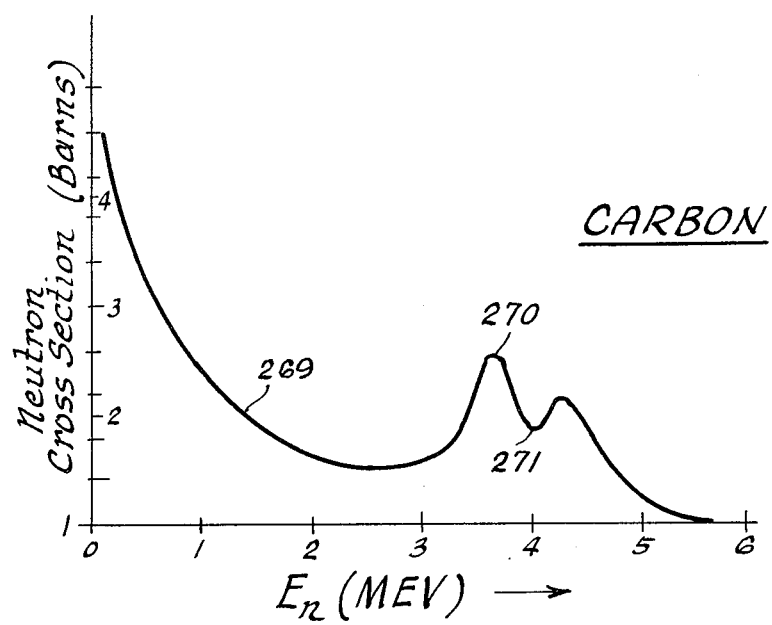
Figure 12:
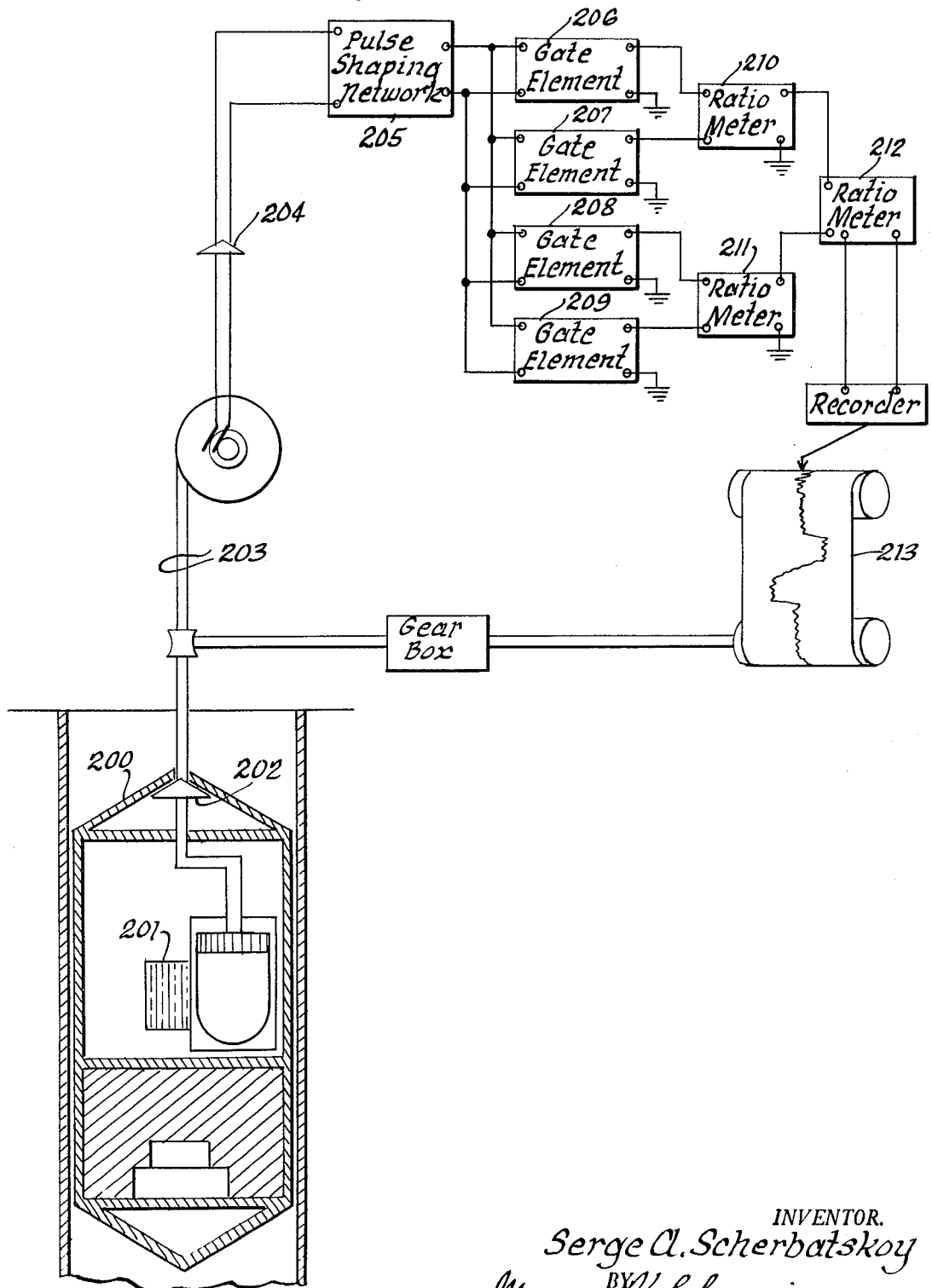
Figure 13:
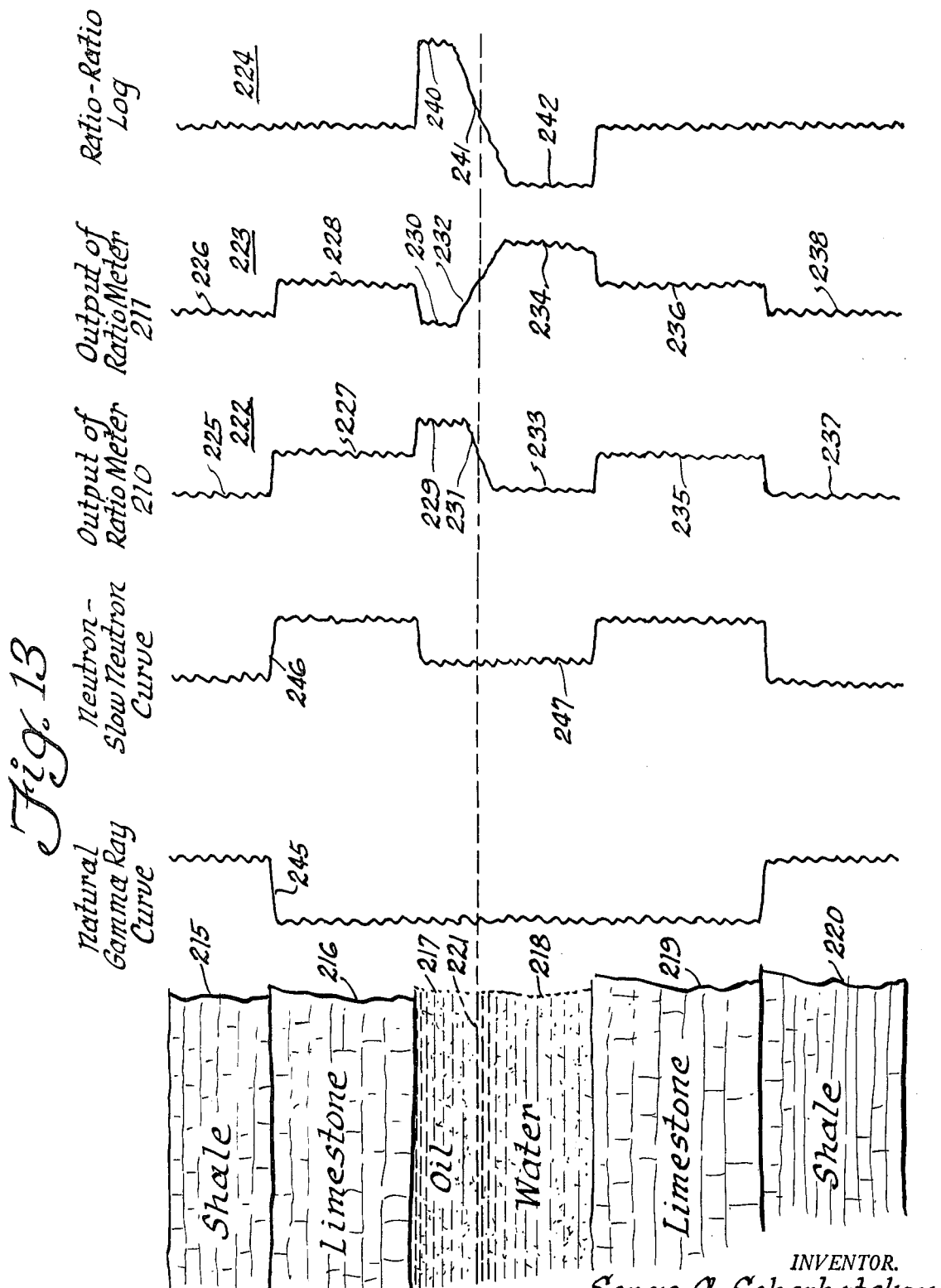
Figure 14:
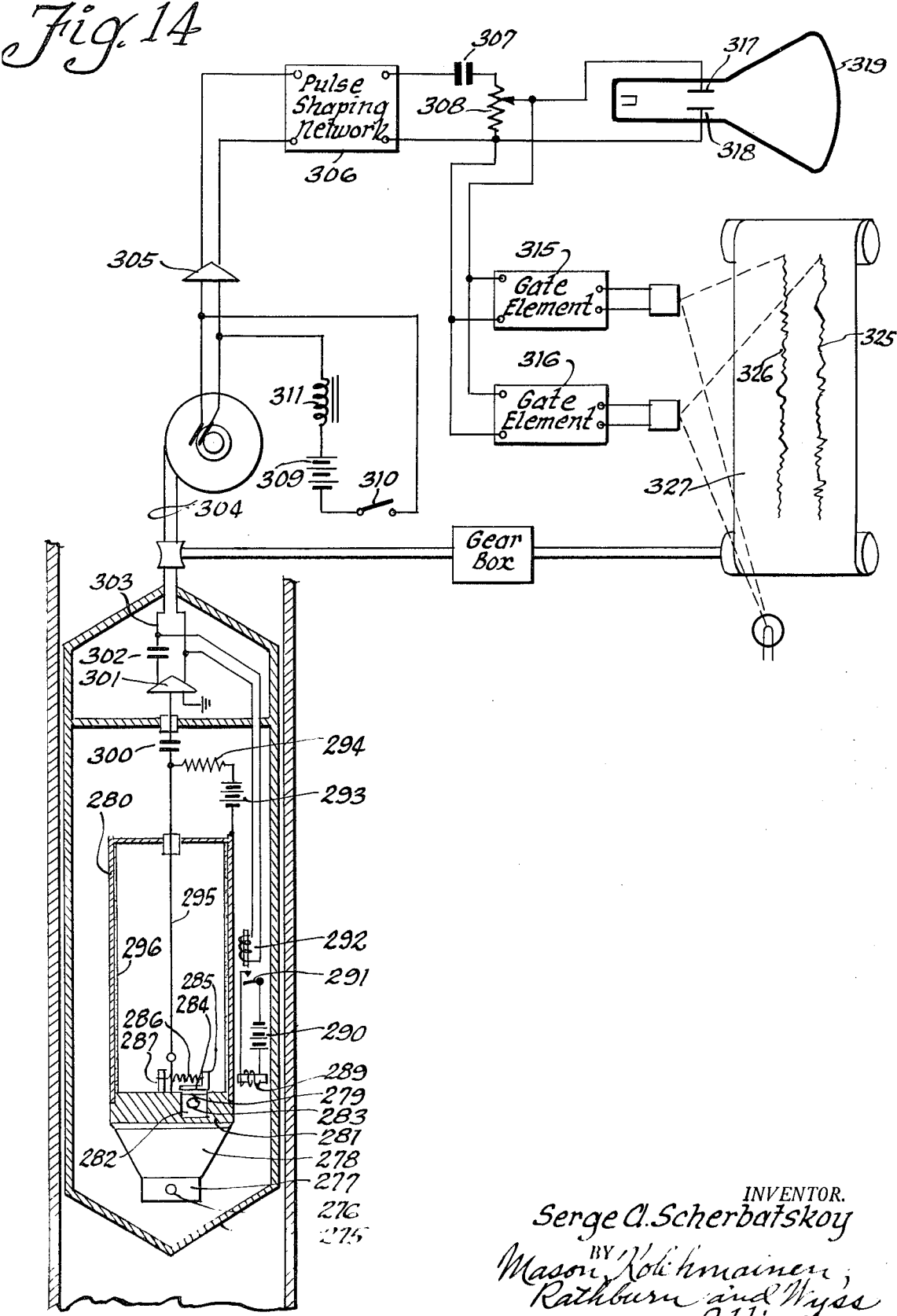

FIGS. 6 to 9, inclusive, are graphs of different portions of the graph of FIG. 5 on a somewhat larger scale;

FIG. 10 is a graph illustrating the neutron cross section characteristic of the element oxygen;

FIG. 11 is a graph illustrating the neutron cross section characteristic of the element carbon;

FIG. 12 illustrates diagrammatically an alternative well logging system of the invention wherein the ratio of oil to water in the formations may be obtained;

FIG. 13 shows voltage variations obtained at various points in the system of FIG. 12, correlated with typical formations;

FIG. 14 illustrates diagrammatically another alternative well logging system of the invention wherein the operation of the system may be checked periodically by means of reference particles of known energy which may be selectively impressed upon the detector by means of apparatus controllable from the earth's surface;

FIGS. 15 and 16 illustrate the cathode ray tube pictures obtained with the apparatus of FIG. 14; and FIG. 17 is a chart illustrating the various combinations obtainable in the system of FIG. 1 and the manner in which the logs may be interpreted to detect oil.

Referring now to the drawing and particularly FIG. 1 thereof, there is schematically illustrated a drill hole 9 penetrating the formations to be explored. The drill hole is defined in the conventional manner by a tubular metallic casing designated by 10. For the purpose of exploring the formations along the bore hole there is provided in accordance with the present invention exploratory apparatus comprising a housing 11 which is lowered into the bore hole 9 by means of a cable 12, including as a part thereof suitable insulated conductors. The cable 12 has a length somewhat in excess of the depth of the bore hole to be explored and is normally wound on a drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 is mounted on a shaft 15, and rotation of the reel and consequently of the shaft 15 is transmitted through a gear box 16 to another shaft 17 which is drivingly connected to take up spool 18 for moving a photographic film 19 from a feed spool 20 to the take up spool 18.

The housing 11 of the exploratory apparatus is divided into three sections designated by numerals 21, 22, and 23, respectively. In the section 21 there is provided a solid support 24 on which is disposed a suitable source of neutrons generally designated as 25, such for example as radium beryllium preparation, which may be enclosed in a container made of a suitable material such as glass. Instead of radium beryllium preparation, the source of neutrons may comprise, for example, a discharge tube adapted to bombard a beryllium or lithium composition with deutrons, thus causing a generation of neutrons in a manner understood by those skilled in the art. This neutron source 25 is enclosed within a jacket 26 made of a material such as lead, which allows the neutron rays to pass completely, or for the greater part therethrough.

In FIG. 1A a discharge tube type neutron source is illustrated, comprising a discharge tube indicated at 25a, arranged to bombard a beryllium or lithium composition, as indicated at 25b, with deuterons. As will be understood, when the neutron generator illustrated in FIG. 1A is used, it will be disposed at the location 25 in FIg. 1.

The section 22 comprises a scintillation counter consisting of an anthracene crystal 30, and a photomultiplier provided with a suitable voltage supply, the combined photomultiplier and voltage supply being schematically designated by the block 31. It is well known that the anthracene crystal 30 is adapted to convert any incoming radiation such as gamma rays, neutrons, alpha particles, etc., into impulses of light. These impulses of light subsequently impinge upon the photomultiplier 31. The output of the photomultiplier is subsequently amplified in the linear amplifier 32.

The anthracene crystal 30 is directly exposed to a stream of monoenergetic alpha rays emitted by a suitable substance 33 such as polonium adjacent thereto and emitting alpha rays of energy 5.3 MEV. Instead of polonium any other suitable source of monoenergetic alpha rays having energy substantially above 2.5 MEV may be used. We may use ionium (isolated from its daughter products) emitting alpha rays of energy 4.66 MEV. All the surface of the anthracene crystal except the portion of said surface that is in direct contact with the substance 33 is covered with a thin layer 34 of boron.

The performance of the instrument of FIG. 1 is based essentially upon the collision between the neutrons derived from the source 25 and the target nuclei of various elements contained in the formation adjoining the drill hole. As a result of these collisions three types of radiations are produced at the points of interaction between the neutrons and target nuclei, i.e., gamma rays, fast neutrons, and slow neutrons. The gamma rays are emitted by nuclei that become excited either by a collision or by a capture of a neutron and subsequently return to lower energy state. The fast and slow neutrons result from the collisions between the neutrons derived from the source 25 and the target nuclei of the formations. At each collision a neutron loses a portion of its energy, and therefore, if the collision cross section of the target nucleus is large, the collisions are numerous and the energy of the impinging neutrons is progressively degraded until it reaches its "thermal value" of 0.025 ev. Consequently slow neutrons are produced. On the other hand, if the collision cross section of the target nucleus in the formations is small, the collision is less frequent and consequently the neutrons do not lose their energy very noticeably. Consequently, we obtain fast neutrons.

It is, therefore, apparent that the relative amounts of gamma rays, fast neutrons and slow neutrons produced in the above processes depend upon the chemical nature of various elements in the earth's formations. Thus by separately measuring these three radiations, valuable geological information may be derived concerning the nature of these formations.

The gamma rays and fast neutrons penetrate easily the boron layer 34 and interact with anthracene providing a suitable light impulse which subsequently strikes the photomultiplier 31 and causes electrical impulses to appear in the output of the amplifier 32. The slow neutrons are, however, absorbed by the boron in the layer 34, said boron emitting upon each absorption an alpha ray of an energy about 2.5 MEV. This alpha ray subsequently interacts with the anthracene crystal providing a suitable light impulse which subsequently strikes the photomultiplier 31 and causes electrical impulses to appear in the output of the amplifier 32.

It is well known that gamma rays, fast neutrons and slow neutrons do not interact directly with anthracene crystal. The interaction process is indirect and is different for each of these three radiations. Thus an incoming gamma ray interacts with one of the atoms of anthracene and causes ejection of a photoelectron or Compton electron, the energy of said electron being usually of the same order of magnitude as the energy of the incoming gamma ray. An incoming fast neutron strikes one of the nuclei of anthracene, such as nucleus of hydrogen in which case the nucleus recoils in form of a proton the energy of which is usually of the same order of magnitude as the energy of incoming fast neutron. An incoming slow neutron interacts with the boron layer 34 and causes emission of an alpha particle of an energy approximately 2.5 MEV. We obtain thus in each case an emission of an electrically charged particle of a different rest mass. An incoming photon ejects an electron, an incoming fast neutron ejects a proton having rest mass about 1,800 times larger than the electron and an incoming slow neutron ejects an alpha particle having a rest mass about 7,200 times larger than the electron. It is well known that the energy of an electrically charged particle that is used to excite the atoms of anthracene is larger, the smaller is the rest mass of the particle. The corresponding impulses of light emitted by anthracene atoms upon their return to the ground state are the most intense for light particles such as electrons, less intense for heavier particles such as protons, and the least intense for the heaviest particles such as alpha rays. Thus the light impulses, and consequently the electrical inpulses resulting from these three radiations are substantially in the ratio 9:2:1, i.e., the impulses caused by gamma rays are about 9 times larger than those caused by alpha particles and the impulses caused by fast neutrons are about 2 times larger than those caused by alpha particles. This invention differentiates between these ranges of magnitude for separately detecting gamma rays, fast neutrons, and slow neutrons, repsectively.

Figure 2:
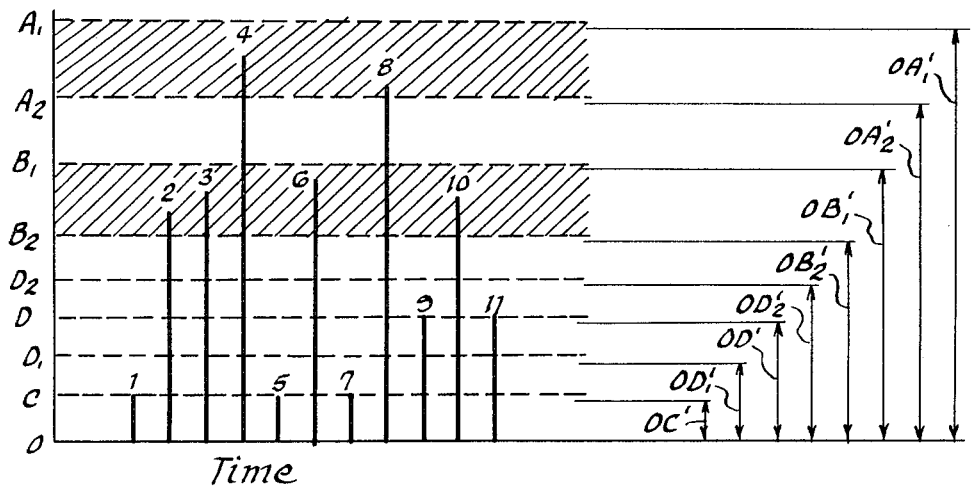
FIG. 2 illustrates diagrammatically current impulses representing various radiations detected in the bore hole.
Figure 4:
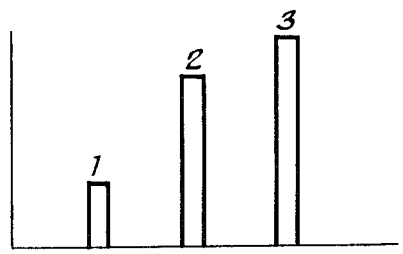
FIG. 4 shows diagrammatically the output of a pulse shaping network.

The output of the amplifier 32 is transmitted to the top of the bore hole through insulated conductors associated with the cable 12. This amplified output consists of a succession of discrete pulses, the magnitudes of which are within three energy ranges that represent gamma rays, fast neutrons, and slwo neutrons, respectively. These output pulses are subsequently amplified in the second amplifier 39 located above the opening of the bore hole. The output of the amplifier 39 is connected to a pulse shaping network 40 which is of a standard type and is designed to provide an output voltage for each pulse that will have a rectangular shape and a variable height as shown in FIG. 4, said height representing the magnitude of the impulse. For description of pulse shaping networks see, for instance, the paper on "Counting Rate Meter for Radioactivity Measurements" published in General Radio Experimenter, Vol. XXII, No. 2,3, July-August 1947, pages 1–7. The output terminals of the pulse shaping network are in turn simultaneously applied to five gate elements designated by numerals 41, 42, 43, 44, and 45, respectively. The output of the pulse shaping network 40 consists of a succession of discrete pulses, the magnitude of each pulse serving to identify said pulse, i.e., to determine whether it corresponds to a gamma ray, to a slow neutron, or to a fast neutron. FIG. 2 gives a diagrammatical representation of such an output in which the abscissas represent the time of occurrence of the pulses and the ordinates represent the respective magnitudes of the pulses. The pulses have been designated by consecutive numerals such as 1,2,3, etc. These pulses have been subdivided into four energy groups which are designated by Roman numerals I, II, III, and IV.

Group I comprises pulses smaller than a predetermined value $OA_1$ and larger than a predetermined value $OA_2$. In FIG. 2 the pulses belonging to this group are designated as 4 and 8. These pulses correspond to gamma ray photons impinging upon the anthracene crystal 30.

Group II comprises pulses smaller than a predetermined value $OB_1$ and larger than a predetermined value $OB_2$. In FIG. 2 the pulses belonging to this group are designated as 2,3,6, and 10. These pulses correspond to fast neutrons impinging upon the anthracene crystal 30.

Group III comprises pulses having all substantially a predetermined value OC. In FIG. 2 the pulses belonging to this group are designated as 1, 5, and 7. These pulses correspond to slow neutrons impinging upon the anthracene crystal 3. More directly they correspond to approximately 2.5 MEV alpha rays resulting from the interaction between slow neutrons and the boron layer 34.

Group IV comprises pulses having all substantially a predetermined value OD. These pulses correspond to 5.3 MEV alpha rays emitted by the polonium source 33. In FIG. 2 the pulses belonging to this group are designated as 9 and 11.

The relative ranges of magnitudes of the groups I, II, III, and IV are considerably distorted in FIG. 2 in order to make the graphical presentation clear.

The output pulses as shown in FIG. 2 are simultaneously applied to five gate elements designated by numerals 41, 42, 43, 44, and 45, respectively. Each gate element is characterized by two threshold values, i.e., it is arranged to transmit only those impulses the magnitude of which is below the upper threshold and above the lower threshold.

Thus the gate 41 has an upper threshold determined by the value $OA_1$ and a lower threshold determined by the value $OA_2$. Consequently, this gate 41 transmits only the impulses of the group I. The gate 42 has an upper threshold determined by the value $OB_1$ and a lower threshold determined by the value $OB_2$. Consequently the gate 42 transmits only the impulses of the group II. The gate 43 has an upper threshold that is slightly above the value OC and a lower threshold that is slightly below the value OC. Consequently the gate 43 transmits only the impulses of the group III. The gate 44 is adapted to transmit signals having magnitude $OD_1$ somewhat smaller than OD, but cannot transmit signals having magnitude OD. Consequently the upper threshold of the gate 44 is slightly above the value $OD_1$ but below the value OD and the lower threshold is slightly below the value $OD_1$. The gate 45 is adapted to transmit signals having magnitude $OD_2$ somewhat larger than OD but cannot transmit signals having magnitude OD. Consequently the lower threshold of the gate 45 is slightly below the value $OD_2$ but above the value OD and the upper threshold is above the value $OD_2$.

The gates 41, 42, 43, 44, and 45 are provided with control terminals 51, 52, 53, 54, and 55, respectively, that receive corresponding control voltages.

The magnitude of the control voltage applied to the terminals 51 determines the value of the thresholds $OA_1$ and $OA_2$. By increasing (or decreasing) the control voltage the values of the thresholds $OA_1$ and $OA_2$ are increased (or decreased). However, the difference between the values $OA_1$ and $OA_2$ is maintained constant. Consequently the increase (or decrease) of the control voltages causes a shift of the transmitted band of magnitudes upwards toward larger values (or downwards towards smaller values). However, the width of the transmitted band is maintained constant and independent of the variation in the control voltage.

Similarly, the magnitude of the control voltage applied to the terminals 52 (or the control voltage applied to the terminals 53) determines the threshold values $OB_1$, $OB_2$ or the threshold values immediately above or immediately below the value OC. By increasing or decreasing the control voltage applied to terminals 52 (or the control voltage applied to terminals 53) the threshold values $OB_1$, $OB_2$ l(or those immediately above and below OC) are correspondingly increased or decreased. However, the difference between these two thresholds is maintained constant and independent of the variation in the control voltage.

The output terminals of the gate elements 41, 42, 43 are connected through leads 56, 57, 58 to galvanometer coils 59, 60, 61, respectively. The galvanometer coils have attached thereto suitable mirrors in a manner well known to those skilled in the art and are adapted to reflect beams of light derived from a source 62, thereby effectively producing on the sensitive film 19 a record comprising three tracesdesignated as 63, 64, 65, respectivelye, and representing the variations of the voltage applied to the galvanometer coils 59, 60, 61, respectively.

It is thus apparent that the trace 63 represents the neutron-gamma ray log, the trace 64 represents the neutron-fast neutron log, and the trace 65 represents the neutron-slow neutron log.

It will be understood that the energy ranges of the illustrated energy Groups I, II and III may be varied as desired by changing the upper and lower threshold limits thereof so that a log of any particular energy range may be obtained. It will also be understood that the width of a selected energy range is preferably relatively small so that the effects of background radiation, etc., do not interfere with the log. In order to illustrate the effects of the cross section of the formations and the spectrum of the fast neutron source 25 upon the height of the pulses produced by the detector and the advantages of the selective logs produced by means of the above described thresholds, which in effect provide so-called windows for analyzing only those pulse heights which fall within a predetermined narrow range of energies, there is shown in FIG. 5, a graph illustrating the variation of pulse height with frequency of occurrence of the pulses. In FIG. 5 the frequency of occurrence of the pulses is plotted as the ordinate and pulse height is plotted as the abscissa. It will be observed from FIG. 5 that the pulse height curve 260 has a first region $a$ in which the frequency of occurrence of the pulses is relatively high although the pulse height is very small. This region is a result of the so-called dark current due to electrons emitted by the cathode of the photomultiplier tube 31. At a somewhat greater pulse height, the region $b$ is encountered in which region traces designated pulses produced by the respectively, are due to natural gamma rays emanating from the formations traversed by the bore hole and intercepted by the detector. The curve 260 also has a portion $d$ in which region the pulses are due to the boron reaction in the layer 34 whereby alpha rays of approximately 2.5 MEV energy are produced. The curve 260 has another region $f$ in which the pulses produced by the detector are due to the main line of the spectrum of the neutron source 25 and the curve 260 has a further region $g$ in which pulses are produced by gamma rays of capture which are developed in the formations as the bombarding fast neutrons are slowed down in hydrogenous material in the formations.

It will be observed from FIG. 5 that the curve 260 exhibits many peaks and valleys, both in the illustrated regions a to g, inclusive, and in between these regions, which if allowed to influence a particular log, would completely mask the desired variations in these regions with the result that the log would be unreliable and, in fact, incapable of being interpreted. However, if only a selected narrow band of pulse heights is examined at a time, by means of the above described "window" technique employing gate circuits which establish thresholds such as those illustrated in FIG. 2, considerable valuable information may be obtained concerning the nature of the formations. For example, the frequency of occurrence of pulses of one particular height may vary considerably when certain parameters of the environment are changed and the frequency of occurrence of pulses of a different height may vary when other parmters of the environment are changed. For example, the frequency of occurrence of the largest amplitude pulses varies considerably when metals are present in the formations, and, if the thresholds of the fast neutron gate element 42 are adjusted to accept only those pulses due to fast neutrons having energies above approximately 7 MEV, the resulting log will represent the product (relative abundance of neutron absorbing materials) × (fast neutron cross sections). Such a log would indicate primarily metals such as iron, nickle, copper, zinc, tungsten, lead and potassium, which have neutron cross sections which are substantially higher than those of lighter elements encountered in the formations. Since hydrogen has a neutron cross section of approximately one Barn for 7 MEV fast neutrons, whereas the above-mentioned metals have neutron cross sections greater than 3 Barns for neutrons of the same energy, it will be evident that variations in the pulse height within the above described energy range above 7 MEV will indicate the presence of metals in the formations. In this connection, it will be understood that the curve 260, shown in FIG. 5 is not drawn to scale and is shown primarily to illustrate the peaks and valleys encountered in different pulse height ranges which may be due to the spectrum of the neutron source, the cross section of the environment and other factors such as described above.

The above described selective fast neutron log may also be employed to detect the presence of particular elements in the formations which are directly indicative of the presence of oil and water in the formations. Thus, in the region c the curve 260 undergoes a marked change when oxygen is present in the formations. This change is more clearly illustrated in FIG. 8 of the drawings wherein a portion 261 of the curve 260 is shown on a somewhat larger scale. Referring to FIG. 8, the frequency of occurrence of the pulses within the region c normally has the value indicated by the full line curve portion 261. However, when oxygen is present in the formations adjacent the sub-surface unit, the curve 261 decreases appreciably in the region c as illustrated by the dotted line curve 262. This change in the frequency of occurrence of the pulses within the region c may be more readily understood by reference to the neutron cross section curve for oxygen which is shown in FIG. 10 of the drawings. In FIG. 10, the neutron cross section of oxygen is plotted with attenuation in Barns as the ordinate and with neutron energy in MEV as the abscissa. It will be evident from an inspection of the cross section curve 266, shown in FIG. 10, that this curve exhibits abrupt changes in neutron cross section for neutrons of different but relatively closely spaced energies. Thus, for neutrons of 0.45 MEV energy, oxygen has a cross section of approximately 7 Barns, as illustrated by the peak 267 in FIG. 10, whereas for neutrons of approximately 0.65 MEV energy, oxygen has a neutron cross section of approximately 2 Barns indicated by the valley 268. It will, therefore, be evident that the abrupt change in the neutron cross section curve 266 will produce a corresponding change in the frequency of occurrence of pulses in a pulse height region which corresponds to these energy levels — this change being illustrated in FIG. 8 as the dotted line 262. Accordingly if the thresholds of one of the gate elements in the system shown in FIG. 1 are adjusted to provide a fast neutron log of only the pulses within the region c, this log will vary appreciably when oxygen is present in the formations. Since the neutron cross section of oxygen is high for low energy neutrons, as illustrated by the peak 267 in FIG. 10, the frequency of occurrence of pulses in this energy range will decrease in the presence of oxygen since more fast neutrons in this energy range will be attenuated in oxygen than in other elements in the formations.

In a similar manner, the presence of carbon in the formations may be determined in specific pulse height region e of the curve 260 shown in FIG. 5. This portion of the curve 260 is shown in FIg. 9 on a somewhat larger scale as the full line curve 264 and the changes in this curve segment when carbon is present in the formations adjacent the detector is illustrated by the dotted line 265. Carbon also exhibits abrupt changes in neutron cross section for neutrons of different energy, although these changes are not as pronounced as in the case of oxygen. Thus, in FIG. 11 the neutron cross section curve for carbon is shown wherein the parameters are the same as in FIG. 10. It will be evident from FIG. 11 that the cross section curve 269 exhibits a sharp peak 270 for neutrons of 3.5 MEV energy and also exhibits a pronounced valley 271 for neutrons of 4.0 MEV energy. These abrupt variations in cross section produce corresponding variations in the frequency of occurrence of the pulses within the region c as shown by the dotted line curve 265 in FIg. 9. In this connection, it will be understood that the elements oxygen and carbon are almost unique in that their neutron cross section curves exhibit the above described abrupt variations, whereas the neutron cross section curves of most other elements are substantially uniform or smoothly varying so that no great change in pulse height occurs due to changes in the other elements. Furthermore, since these abrupt changes take place in specific narrow energy ranges, these elements may be detected from other elements which exhibit abrupt variations which occur in different energy ranges. Accordingly, by use of the above described window techinque, a selective fast neutron log may be obtained which gives valuable information concerning the presence of oxygen, which indicates water, but is not present in oil, or the presence of carbon which indicates oil but is not present in water. In this connnection it will be noted that the curve 266 exhibits several peaks and valleys any one of which may be employed to detect the presence of oxygen. Also, if one peak conflicts with a mild variation in the cross section curve of another element, a peak in a different energy range may be employed, the peak 267 being described merely for purposes of illustration.

The accuracy of detection of either oxygen or carbon may be increased by obtaining two selective fast neutron logs which are specifically related to the peak and valley of the neutron cross section curve of the element. Thus, if increased accuracy in the detection of oxygen is desired, the gate element 42 may be adjusted to accept only those pulses which fall within the relatively narrow region $c_1$ (FIG. 8) which corresponds to the energy range of the peak 267 in the cross section curve 266 for oxygen shown in FIG. 10, and the gate element 41 may be adjusted to accept only those pulses which occur in the relatively narrow region $c_2$ which corresponds to the energy level of the valley 268 in FIG. 10. When the sub-surface unit is traversing formations which do not contain oxygen, the two selective fast neutron logs produced by the gate elements 42 and 41 will be very similar as evidenced by the full line curve 261 in FIG. 8. However, when the instrument traverses formations which contain oxygen, and hence water, the abrupt changes in the neutron cross section curve for oxygen will cause the log of the region $c_2$ to decrease substantially and the log of the region $c_2$ to increase substantially, as will be clearly evident from an analysis of FIG. 8. With this arrangement, interpretation of the logs merely involves the determination of points or zones in which the two fast neutron logs are not identical and these zones will indicate the presence of oxygen.

In a similar manner, the presence of carbon within the formations may be more accurately determined by employing two selective fast neuton logs which produce opposite responses in the presence of carbon due to the abrupt changes in the neutron cross section curve for carbon. More specifically, the gate element 42, for example, may be adjusted to accept only those pulses which occur in the narrow region $e_1$ (FIG. 9), which corresponds to the peak 270 in the neutron cross section curve 269 FIG. 11, and the gate element 41 may be adjusted to accept only those pulses which occur in the narrow region $e_2$, which corresponds to the valley 271 of the cross section curve 269. It will be evident from FIG. 9, that when the fast neutrons from the source 25 encounter carbonaceous material in the formations, the frequency of occurrence of the pulses in the region $e_1$ will decrease, due to the higher attenuation in carbon for neutrons of the corresponding energy, and the frequency of occurrence of the pulses in the region $e_2$ will increase, due to the reduced attenuation in carbon for neutrons of the corresponding energy. Accordingly, either oxygen or carbon may be accurately detected by providing selective fast neutron logs which are correlated with the unique peaks and valleys in the cross section curves of these elements so as to provide an accurate indication of the presence of these elements in the formations. It will also be understood that in the case of oxygen which exhibits several pronounced peaks and valleys, the accuracy of detection of this elements may be further increased by employing two pairs of gate elements which are adjusted to accept pulses corresponding to two peaks and two valleys of the oxygen cross section curve 266. Thus, in addition to the above described double oxygen log, another pair of gate elements adjusted to accept only pulses corresponding to the peak 267c and the valley 268a in the oxygen curve 266 may be employed to produce another double oxygen log. With this arrangement only simultaneously occurring dissimilar variations in the four logs will indicate the presence of oxygen.

The trimultaneous well logging system of FIG. 1, also provides important geological information concerning the nature of the formations due to the correlation of the neutron-gamma ray of capture log, the neutron-slow neutron log and the neutron-fast neutron log, and the fact that all of these logs are obtained by a single detector, so that the responses of the detector to gamma rays of capture, slow neutrons and fast neutrons, all result from the same rock formations. This correlation is further enhanced by the use of a neutron source, such as the illustrate deutron discharge tube arrangement, which has relatively little gamma radiation, so that the neutron-gamma ray of capture curve is not influenced by gamma rays produced by the neutron source 25. When such a source is employed the so-called caliper effect, which would tend to mask the desired neutron-gamma ray of capture curve, is avoided. This caliper effect arises when a gamma radiating source and a gamma ray detector are employed in the same instrument. In such an arrangement, the preponderance of the gamma rays received by the detector travels through the mud-filled annular spaces between the instrument and the casing and between the casing and the sides of the borehole. Since the diameter of the bore hole varies, the effects of this variation influence the log if a gamma radiating source is employed. The neutron-gamma ray of capture curve 63, and the neutron-slow neutron curve 65 are generally similar in shape, and both indicate the presence of hydrogenous material in the formations. However, when the subsurface unit 11 is positioned adjacent a formation containing carbon, the curve 63 has a relatively small value, since carbon does not capture neutrons, but merely slows them down and does not produce any substantial number of gamma rays of capture in the process. This is because carbon has a very low capture cross section and very few gamma rays of capture are produced even though a substantial number of fast neutrons of source 25 may be slowed down in the carbonaceous material. On the other hand, the neutron-slow neutron curve 65 shows a substantial increase when the subsurface unit is positioned adjacent formations containing carbon, since carbon slow down the fast neutrons very effectively and hence a large number of slow neutrons are produced.

When the subsurface unit is positioned adjacent hydrogenous material and other formations not containing carbon, the curves 63 and 65 are substantially identical. Accordingly, by determining the zones in which the curves 63 and 65 are dissimilar, the presence of carbon may be detected and since carbon occurs in oil but not in water, such determination may indicate the presence of oil.

The fast neutron curve 64 may be employed to substantiate the data provided by the curves 63 and 65 by adjusting the thresholds of the gate element 42 so that this element accepts only those pulses which fall within the region $e$ (FIG. 9), corresponding to the energy range of fast neutrons which are influenced by carbon. Accordingly, the neutron-fast neutron curve 64 will decrease when the sub-surface unit is positioned adjacent formations containing carbon, but will remain substantially constant for all other types of formations. Therefore, the presence or absence of carbon in the formations as determined by a comparison of the logs 63 and 65, may be substantiated by comparing the corresponding portion of the log 64 to determine if a variation has also occurred in this log, it being understood that all three logs 63, 64 and 65 are correlated with depth.

The trimultaneous well logging system shown in FIG. 1 may also be employed to determine the presence or absence of oil in the formations in a somewhat different manner. Thus, the thresholds of the gate element 41 may be adjusted to accept only those pulses of relatively low amplitude which are produced by natural gamma rays naturally emenating from the formations as illustrated by the region $b$ in the curve 260 shown in FIG. 5. The region $b$ is shown on a somewhat larger scale in FIG. 6, and if there are relatively few natural gamma rays present in the formations, the response of the detector will be substantially as shown by the sold curve 250, whereas if the natural gamma rays are intense, the output from the detector in the region $b$ will be substantially as shown by the dotted line 251 in FIG. 6. As described heretofore, the gate element 43 is adjusted to accept only those pulses in the region $d$ which corresponds approximately to an energy of 2.5 MEV so that this gate element responds to pulses arises as a result of the boron reaction in the layer 34 when slow neutrons strike this layer. Thus, when the subsurface unit is adjacent a formation which does not contain hydrogen, relatively few slow neutrons are produced and the output of the detector is substantially as shown by the solid line curve 252 in FIG. 7. On the other hand, if the subsurface unit is adjacent hydrogenous material, the response of the detector is as indicated by the dotted line curve 252 in FIG. 7. The gate element 42 is adjusted to selectively log fast neutrons in the region $e$ corresponding to carbon as described immediately above.

With the above described adjustment of the gate elements 41, 42, 43, so that natural gamma rays, slow neutrons, and fast neutrons are selectively logged, a determination of the oil content of the formation may be directly obtained. Thus, the natural gamma ray log locates sands, the neutron-slow neutron log located hydrogenous material, and the neutron-fast neutron log locates carbon. The fast neutron log locates carbon, but carbon occurs in forms other than oil, as for example, in limestone. The slow neutron log locates hydrogen but hydrogen can occur in shales which are not fluid bearing. The natural gamma log locates sands but the sands can be dry. Only by a correlation of all three of these logs is it possible to locate oil. In order to illustrate this more clearly, there is shown in FIG. 17 of the drawings, a chart which illustrates the correlation of the above described logs. In the first column, there is shown the number of the combination, there being eight possible combinations of the three illustrated logs. The second column shows the variations of the natural gamma ray log, a Y being used to indicate shale or radioactive rock, in which the gamma ray curve has the value 251 shown in FIG. 6, and an N is used to indicate limestone or sandstone, in which case the gamma ray curve has the value 250 shown in FIG. 6. In the third column variations in the slow neutron log are indicated, a Y being used to indicate hydrogenous material, in which case the slow neutron curve has the value 253 shown in FIG. 7, and an N is used to indicate nonhydrogenous material, in which case the slow neutron curve has the value 252. In the fourth column variations in the selective fast neutron log are shown, a Y being used to indicate the presence of carbon, in which case the fast neutron curve has the value indicated by the dotted line 265 in FIG. 9 within the region $e$, and an N is used to indicate the absence of carbon, in which case the slow neutron curve has the value of the curve 264 within the curve $e$ (FIG. 9). The fifth column shows the interpretation of the identity of the formations by combination of the illustrated logs. It will be evident that only combination No. 5 gives the particular indication corresponding to the presence of oil in sandstone. Accordingly, by correlating the above described logs, the presence of oil in sandstone may be determined by means of a single pass through the bore hole. It will also be understood that in many areas, such as most of Texas; it has previously been determined by other methods well known to those skilled in the art that there is little, if any, limestone in these areas. Accordingly, in these areas it can be assumed that the only fluid bearing formation is sandstone.

In order to provide a satisfactory arrangement for producing logs such as described above, consideration should be given to the temperature dependence of the nuclear detecting instrument. It is well known that the sensitivity of the anthracene crystal 30 decreases with the temperature, i.e., as the temperature of the crystal increases, the amount of light emitted by the crystal (as a result of interaction with an impinging nuclear particle) decreases and the magnitude of the electrical pulse emitted by the photomultiplier 31 becomes smaller.

As the exploring apparatus travels down to various depths in the drill hole it encounters various formations, the temperature of which undergoes some local variations and usually increases with depth. It is thus apparent that in order to compare two measurements performed at different temperatures we should provide an arrangement that compensates for the variation in sensitivity of the anthracene crystal. Such a compensating arrangement includes as one of its essential parts a suitable monoenergetic alpha ray emitter such as polonium 33 placed adjacently to the crystal 30. Under normal temperature conditions we obtain across the output terminals of the network 40 as a result of the radiation from the source 33, uniform electrical impulses having substantially the magnitude OD as shown in FIG. 2. These impusles designated as impulses of Group IV cannot be transmitted through either of the gates 41, 42, 43. Furthermore, these impulses are too large to be transmitted through the gate 44 and too small to be transmitted through the gate 45. When, however, the temperature of the crystal increases, its sensitivity decreases. Consequently, the impulses of the group IV decrease in size and when they reach the magnitude $OD_1$ they pass through the gate 44 and produce a suitable voltage across the output terminals 70 and said gate. On the other hand, when the temperature of the crystal decreases, its sensitivity increases. Consequently the impulses of the Group IV increase in size and when the reach the magnitude $OD_2$ they pass through the gate 45 and produce a suitable voltage across the output terminals 71 of said gate.

It is thus apparent that when the sensitivity of the detector decreases we obtain a voltage across the terminals 70 and when the sensitivity increases, we obtain a voltage across the terminals 71. The terminals 70, 71 are respectively applied to excitation windings 72, 73 of a d.c. motor 74, said motor receiving its current supply from a battery 75. The windings 72, 73 are wound in such a manner as to produce two opposing magnetic fluxes. The motor 74 is adapted to displace angularly a rotatable conductive member 75 by means of a shaft 76. When the excitation winding 700 is energized by the voltage output from the gate 44, the member 75 effects an annular displacement in clockwise direction. When, however, the excitation winding 73 is energized by the voltage output from the gate 45, the member 75 effects an angular displacement in anticlockwise direction. One terminal 77 of the member 75 at the point of rotation is connected to a lead 78 and the other terminal 79 is slidingly engaged on a fixed semicircular resistor 80, said resistor having its two terminals 81, 82 connected to a battery 83.

It is apparent that the voltage between the grounded terminals 82 and the lead 78 decreases when the member 75 rotates clockwise and increases when it rotates anticlockwise. This voltage is simultaneously transmitted to the control terminals 51, 52, 53, 54, and 55 of the gates 41, 42, 43, 44, and 45, respectively.

In order to understand the operation of the compensating arrangement, assume that the exploring instrument is exposed to an increase in temperature. Consequently, the sensitivity of the detecting apparatus decreases. The impulses corresponding to gamma rays do not fall any longer within a range of magnitudes $OA_1$, $OA_2$ shown in FIG. 2. They fall within a lower range of magnitudes defined by limits $OA_1{}^1$ and $OA_2{}^1$, which are respectively below the corresponding limits $OA_1$ and $OA_2$ as shown in FIG. 2. Similarly, the impulses corresponding to fast and slow neutrons do not fall any more within magnitude ranges $OB_1$ and $OB_2$ and $OC$, respectively, but within lower ranges of magnitudes defined by limits $OB_1{}^1$, $OB_2{}^1$ and by the value $OC^1$ respectively.

It is therefore apparent that when the temperature of the crystal is increased, the gates 41, 42, 43 are not adapted any more to transmit impulses that are caused by gamma rays, fast neutrons and slow neutrons, respectively. It is therefore necessary to modify the transmitting characteristics of the gates 41, 42, and 43, so as to lower the bands of magnitudes from the positions $A_1A_2$; and C to the positions $A_1{}^1$ $A_2{}^1$; $B_1{}^1B_2{}^1$; and $C^1$. This is effected by means of the control voltage appearing across the output terminals 70 of the gate 44 in the manner hereinabove described. Said control voltage causes the rotation of the shaft 75 in a clockwise direction. It is apparent that as the shaft 75 rotates, the control voltages applied to the terminals 51 to 55 decrease in magnitude and cause a progressive downward shaft of the threshold values of the corresponding gates 41 to 45. In particular, the range of magnitudes transmitted through the gate 44 is not any more defined by the magnitude $OD_1$ but by a lower value. Consequently, the impulses corresponding to alpha rays from the polonium source 33 cannot pass any longer through the gate 44. Thus the voltage across the terminals 70 drops to zero and consequently the member 75 stops rotating and reaches a stationary position corresponding to a decrease in the control voltages to the terminals 51, 52, and 53 by a definite amount. This amount is such that the new thresholds corresponding to the gate 41 are not any more $OA_1$, $OA_2$, but $OA_1{}^1$, $OA_2{}^1$. The new thresholds corresponding to the gate 42 are not any more $OB_1$, $OB_2$, but $OB_1{}^1$, $OB_2{}^1$, and the value transmitted through the gate 43 is not $OC$ but $OC^1$.

It is thus apparent that when the temperature of the crystal increases and its sensitivity corresponding decreases the thresholds of the gates 41, 42, 43 adjust themselves automatically so that the gate 41 will accept all the impulses originated by gamma rays and the gates 42, 43 will accept all the impulses originated by fast neutrons and slow neutrons, respectively. A similar automatic adjustment, but in the opposite direction, takes place when the temperature of the crystal decreases and its sensitivity correspondingly increases.

Figure 3:
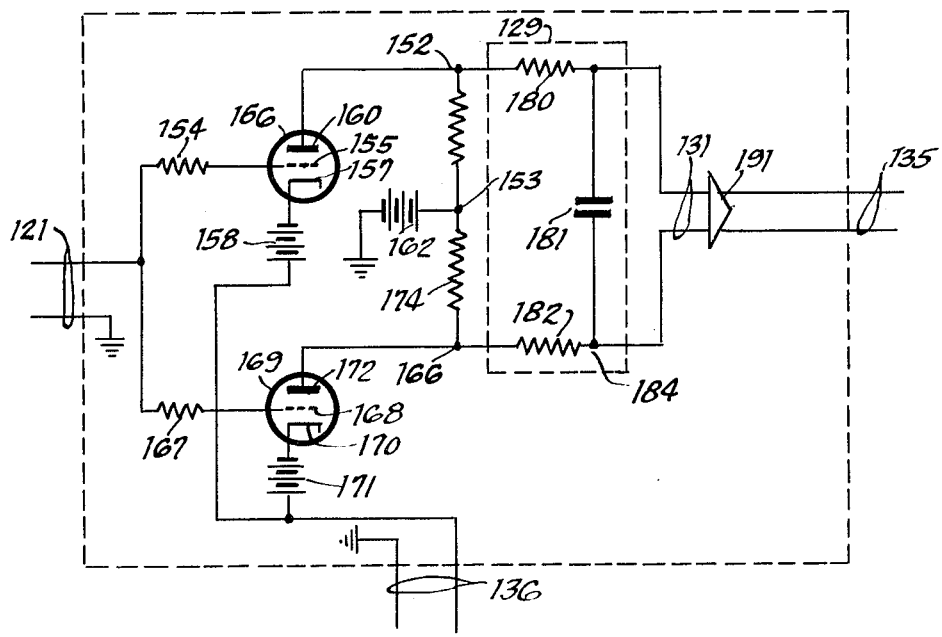
FIG. 3 shows schematically an electric circuit for transmitting impulses within a predetermined band of magnitudes.

Consider now FIG. 3 showing in detail the schematic arrangement of a gate such as one of those designated by numerals 41–45 in FIG. 2. The gate has input terminals 121, output terminals 135 and control terminals 136. The control terminals 136 may be either of those designated by 51–55 in FIG. 1 and the output leads may be either of those designated by 56, 57, 58, 70, 71 in FIG. 1.

The essential element of the gate consists of a band channel comprising two individual channels designated as A. and B. The band channel has its input terminals 121, output terminals 152, 166 and control terminals 136. It is arranged to give across its output terminals a d.c. voltage of constant value $V_1$ only when the input signal applied to terminals 121 is contained within a predetermined range of magnitudes constituting the transmission band. This range of magnitudes is fixed by the control voltage applied to the terminals 136. That is, with a certain setting for the control voltage the circuit will be responsive only to input voltages within a predetermined band. If the input voltage is outside the band no output will be produced.

Assume now that $n$ impulses having magnitudes within the transmission band entered at the input terminals 121. These impulses produce across the terminals 152, 166 $n$ voltage impulses having uniform value $V_1$, each of said voltage impulses having a very short but constant duration. By integrating these impulses per unit of time we obtain a value representing the relative occurrence of impulses witin said predetermined band. This is effected by applying the output terminals 152, 166 to an integrator comprised within the dotted block 129 which will produce across its output terminals 131 a voltage representing the frequency of occurrence of said impulses. This voltage amplified in the amplifier 191 is applied to the output terminals 135.

The channel A comprised within the band channel has input terminals 121 and output terminals 152, 153. One of the input terminals is connected through the resistor 154 to the grid 155 of a triode 156, said triode having its cathode 157 connected in series wth a biasing battery 158 and with a control voltage applied to the control terminals 136. The plate 160 of the triode is connected through the output terminal 152, resistor 161 to the output terminal 153 and then through the battery 162 to ground.

The channel B comprises within the band channel has input terminals 121 and output terminals 153, 166. One of the input terminals is connected through the resistor 167 to the grid 168 of a triode 169, said triode having its cathode 170 connected in series with a biasing battery 171 and with a control voltage applied to the control terminals 136. The plate 172 of the triode is connected through the output terminals 166, resistor 174 to the output terminals 153 and then through the battery 162 to ground.

It is apparent that we obtain across the output terminals 152, 153 only those impulses that are capable of overcoming the biasing voltage of the tube 156. Assume that the voltage of the battery 158 is $E_1$ and that the voltage applied to the control terminals 136 is $E_2$. Then the total biasing voltage is $E_1 + E_c$. Therefore, only the impulses that are capable of exceeding the threshold value provided by the total biasing voltage are transmitted through the channel A and appear across the output terminals 152, 153.

Similarly, in the channel B only those voltages appear across the output terminals 166, 153 that are capable of overcoming the biasing voltage of the tube 169. Assume that the voltage of the battery 171 is $E_2$. Then the total biasing voltage of the tube 169 is $E_2 + E_c$. Consequently, only those impulses that are capable of exceeding the threshold value $E_2 + E_c$ appear across the terminals 166, 153.

The two output voltages across the terminals 152, 153 and 166, 153 are mounted in opposition, so that the resultant output between the terminals 152, 166 is equal to their difference. Consider now three cases designated as (a), (b), and (c).

Case a: The impulse applied to the terminals 121 has a value below the threshold voltages of the tubes 156 and 169. Consequently, no plate currents will be delivered by these tubes and no voltage will appear across the terminals 152, 166.

Case b: The impulse applied to the terminals 121 has a value above the threshold voltages of the tubes 156 and 169. Consequently, both tubes deliver plate currents, and two short voltage impulses appear simultaneously across the output terminals 152,153 and 166, 153. Since these two voltages are equal one to another the resultant voltage aross the terminals 152, 166 is zero.

Case c: The impulse applied to the terminals 121 has a value smaller than the threshold of the tube 169, i.e., smaller than $E_2 + E_c$ and larger than the threshold of the tube 156, i.e., larger than $E_1 + E_c$. Consequently, a plate current will pass through the tube 156 and no plate current will pass through the tube 169. Consequently, no voltage will be produced across the terminals 166, 153 and a short voltage impulse will appear across the terminals 152, 153. We obtain, therefore, across the terminals 166, 152 a resultant voltage coincident with the impulse applied to the terminals 121.

It is thus apparent that at any instant only those impulses that are comprised within the range limited by the value $E_1 + E_c$ and $E_2 + E_c$ produce corresponding output impulses across the terminals 166, 152.

The output impulses derived from terminals 166, 152 are applied to an integrating networkk 129 comprising series resistors 180, 182 and a shunt condenser 181. This network is adapted to translate the voltage applied across its input terminals 152, 166 into an output voltage across the terminals 131 that represents the time integral of the input voltage. Each impulse comprised within the two threshold values that arrive at the terminals 121 corresponds to an output voltage across terminals 152, 166, said output voltage having a fixed value $V_1$ and a fixed duration $\Delta t$. Consequently, we obtain across the output terminals 131 of the integrator a voltage having value $\Sigma V_1 \Delta t$ that represents the number of impulses per unit of time comprised within the range limited by value $E_2 + E_c$ and $E_1 + E_c$. The voltage derived from the terminals 131 is applied through an amplifier 191 to the output terminals 135.

If we refer now to the gate 41 at normal temperature, then the value $E_2 + E_c$ corresponds to the upper threshold $OA_1$, the value $E_1 + E_2$ corresponds to the lower threshold $OA_2$. If the temperature increases then the control voltage applied to the terminals 41 decreases by an amount $\Delta E_c$ and assumes a new value $E_c - \Delta E$. Then the upper threshold assumes a new value $OA_1^1$ corresponding to $E_2 + E_c - \Delta E_c$ and the lower threshold assumes a new value $OAhd 2^1$ corresponding to $E_1 + E_c - \Delta E_c$. It is apparent that the width of the transmitted band is determined by $E_2 - E_1$ and is independent of the value of the control voltage. When the control voltage increases the band is shifted upwards; when it decreases, the band is shifted downward.

Similar relationships hold for all the remaining gates 42–45. It should be noted that at normal temperature the gates 43, 44, 45 admit very narrow bands comprising the magnitudes $OC_1$, $OD_1$, and $OD_2$, respectively. Thus in case of the gate 43 the value $E_2+E_c$ corresponds to value slightly above OC, the value $E_1+E_c$ corresponds to a value slightly below OC and the width $E_2-E_1$ is relatively small. When the temperature increases the band is lowered but maintains its width. The new limits correspond to values $E_2+E_c - \Delta E$, $E_1 - \Delta E$ and the new position of the band includes the value $OC^1$. Similar relationships hold for the gates 44 and 45.

The presence of oil and water in the formations and the determination of the oil-water interface may be determined by the system shown in FIG. 12. Referring to this figure, a sub-surface unit 200 is provided, which may be identical in many respects to the unit 11 described in detail heretofore in connection with FIG. 1 of the drawings. However, in the unit 200 a source of reference particles corresponding to the source 33 has not been shown in order to simplify the drawings, although such a source may be employed if desired to compensate for the changes in the sensitivity of the detector. Also, the crystal 201 is not coated with a layer of boron, since in the illustrated system of FIG. 12 it is necessary only to detect fast neutrons, and hence the boron layer is not required. In other respects, the sub-surface unit 220 is substantially identical to the corresponding unit shown in FIG. 1 and pulses produced in the detector of this unit are amplified in the amplifier 202, are transmitted over the cable 203 to the earth's surface wherein they are amplified in the amplifier 204, and are passed through the pulse shaping network 205 and are impressed upon a group of four gate elements 206, 207, 208 and 209, in parallel. The threshold values of the gate elements 206 and 207 are arranged to accept pulses the frequency of which varies in response to the presence of carbon. More specifically, the thresholds of the gate element 206 are adjusted to accept only those pulses which occur in the region $e_1$ (FIG. 9), and the gate element 207 is arranged to accept only those pulses which fall in the region $e_2$. The outputs of the gate elements 206 and 207, which comprise essentially d.c. voltages which vary in accordance with frequency of occurrence of the pulses in the above identified regions, are impressed upon a ratio meter 210. The ratio meter 210 may be of any suitable circuit arrangement for obtaining an output voltage proportional to the ratio of the outputs of the gate elements 206 and 207. For example, the ratio meter 210 may comprise a circuit arrangement such as shown and described in detail in U.S. Pat. No. 2,129,880 to S. A. Scherbatskoy, et al., granted Sept. 13, 1938.

The gate elements 208 and 209 in the system of FIG. 12 are adjusted to accept pulses in the above describd selective energy ranges for the detection of oxygen in the formations. Thus, the thresholds of the gate element 208 are adjusted to accept only those pulses which occur in the region $c_1$ (FIG. 8), and the gate element 209 is adjusted to accept only those pulses which fall within the region $c_2$. The outputs of the gate elements 208 and 209 are connected to a ratio meter 211, which may be identical to the ratio meter 210, and develops an output voltage proportional to the ratio of the voltages developed by the gate elements 208 and 209. The outputs of the ratio meters 210 and 211, are connected to a third ratio meter 212, which may be identical to the ratio meters 210 and 211, and develops a voltage proportionate to the ratio of the outputs of the two ratio meters 210 and 211.

In order to facilitate an understanding of the system of FIG. 12 there is shown in FIG. 13 a series of curves which represent the output voltages developed by the ratio meters 210, 211, and 212 when the surface unit traverses a series of strata which include a porous limestone zone which contains both oil and water. These curves are shown in conjunction with a natural gamma ray curve and a neutron-slow neutron curve of the same formations. Thus referring to FIG. 13, it is assumed that the subsurface unit traverses a formation consisting of a shale layer 215, a dry limestone layer 216, a porous limestone zone which contains oil 217, a porous limestone zone which contains water 218, a dry limestone layer 219 and a shale layer 220. The interface between the oil and water in the zones 217 and 218 is indicated generally at 221. In FIG. 13 the natural gamma ray curve 245 and the neutron-slow neutron curve 246 are shown for the illustrated formations. The curves 245 and 246 may be obtained by any suitable apparatus and may be employed to substantiate the data obtained by the system shown in FIG. 12. The curves 245 and 246 may, for example, be obtained by means of the logging system shown in FIG. 1. In the alternative, these curves may be obtained by a simultaneous logging system such as shown and described in detail in my copending application Ser. No. 205,616, filed Jan. 12, 1951. It will be understood that the curves 245 and 246 are employed primarily to substantiate the results obtained by the system of FIG. 12 and in many instances where the geological structure is generally known these curves may not be needed.

In FIG. 13, the output of the rate meter 210 is illustrated by the curve indicated generally at 222, the output of the ratio meter 211 is illustrated by the curve indicated generally at 223, and the output of the ratio meter 212 is illustrated by the curve indicated generally at 224. The chemical composition of the formations varies from area to area and it is well known that shales and limestones contain both oxygen and carbon in appreciable amounts. Furthermore, some limestones may have more oxygen and carbon than some shales. When the subsurface unit traverses the shale layer 215, the ratio meters 210 and 211 produce outputs of the values 225 and 226, since the shale layer contains some oxygen and carbon. When the subsurface unit encounters the limestone layer 216, the outputs of both the ratio meters 210 and 211 may increase as indicated at 227 and 228, since certain limestones contain a greater amount of carbon and oxygen than shale. However, when the subsurface unit encounters the oil-filled porous limestone layer 217, the carbon curve 222 increases to a still greater value as indicated at 229, while at the same time the oxygen curve 223 decreases as indicated at 230. At the interface 221, the carbon curve decreases abruptly as indicated at 231, due to the marked decrease in carbon content in traversing the interface, while at the same time the oxygen curve 223 increases abruptly as indicated at 232. During the traversal of the water-filled porous limestone zone 218, the carbon curve 223 has the value 233 and the oxygen curve has the value 234. However, when the dry limestone layer 219 is encountered, both curves return to substantially the same values produced in the layer 216, as indicated at 235 and 236. Furthermore, when the shale layer 220 is encountered, both curves may be further reduced to the values indicated at 237 and 238, respectively, which correspond generally to the initial values 225 and 226.

It will be evident from FIG. 13, that the curves 222 and 223 provide an indication of the presence of fluid in the formations as well as the determination of the oil-water interface, since in these regions the curves are mirror images of each other, whereas in other types of formations the curves are substantially identical. It will also be noted that either one of the curves 222 or 223 gives more information concerning the oil-water interface 221 than the natural gamma ray curve 245 and the neutron-slow neutron curve 246, since these latter curves merely indicate hydrogenous material, shown by the anomaly 247, throughout the fluid bearing zone. However, since the limestone and shales may contain varying amounts of carbon and oxygen, it is desirable to remove ambiguities which would tend to be interpreted as fluid-bearing strata. To accomplish this, the outputs of the ratio meters 210 and 211 are connected to the ratio meter 212 which provides the final curve 224 which may be recorded on the chart 213. It will be noted that the variations in the curves 222 and 223 in passing through shale and dry limestone zones are eliminated in the curve 224, since, in the illustrated embodiment, the ratios of these two curves remains substantially the same in both types of formations. However, in the fluid-bearing zones 217 and 218, an S-shaped variation in the curve 224 is obtained which is unique to fluid-bearing strata containing oil and water. More specifically, in the zone 217, the curve 224 is deflected sharply to the right as indicated at 240, during the interface 221 the curve 224 reverses abruptly to the left as indicated at 241, and during traversal of the zone 218, the curve 224 has the value of 242. In other words, in the predominately oil zone 217, the ratio of the carbon curve 222 to the oxygen curve 223, increases substantially, whereas in the predominately water zone 218, the ratio of the carbon curve 222 to the oxygen curve 223 decreases substantially from the normal or mid-point value thereof. In this connection it will be understood that a single ratio log may be obtained to detect the presence of either oxygen or carbon in the formations, by merely connecting the output of the ratio meter 210 or the output of the ratio meter 211 to a suitable recorder. The oxygen or carbon ratio log thus obtained would provide an electrical comparison of the selective fast neutron responses directly instead of interpreting the two fast neutron logs which are side by side as is done in the system of FIG. 1.

In FIG. 14 of the drawings there is shown an alternative embodiment of the invention wherein reference particles of known energy may be selectively impressed upon the detector by means controllable from the earth's surface. More specifically, there is provided a subsurface unit indicated generally at 275, which contains a source of neutrons 276 positioned within a lead shield 277, and a block of additional shielding material 278 of lead or tungsten is positioned above the shield 277. A gas-filled counter indicated generally at 280, is provided with a base member 281, which is positioned on the block 278. The base member 281, is provided with a well 282 in the uppper surface thereof within which there is positioned a source 283 of reference particles of known energy, as for example uranium 238, polonium 210 or polonium 208, which emit alpha particles in the range of 4 to 5 MEV of uniform energy and which have a relatively long half-life period. In some uses the energy of the particles emitted by the source 283 may be too great for convenient calibrating purposes, in which case a very thin membrane 279, of gold, tantalum or other material which can be produced in extremely thin sheets, is positioned so as to close the well 282 and can be made to reduce the energy of the particles traversing the membrane by any desired amount by merely choosing a suitable thickness for this membrane. Inside the detector 280, there is provided a shutter element 284, having an upstanding position 285 of magnetic material, and the shutter 284 is arranged normally to cover the opening 282 by means of the biasing spring 286 which is attached to the supporting post 287. External to the detector 280, there is provided a solenoid coil 289, which is positioned outside the detector 280 adjacent the magnetic portion 285 of the shutter element 284 and the coil 289 is connected to the battery 290 through the relay contacts 291 of a relay the coil of which is indicated at 292. A high voltage source of potential 293 for the detector 280 is connected through the load resistor 294 to the central wire anode 295 of the detector 280, so that pulses are produced across the resistor 294 in response to radiation intercepted by the detector. In the illustrated embodiment the detector 280 is provided with a coating 296 of boron$_{10}$ so that the detector responds to slow neutrons by virtue of the reaction therewith in the boron layer 296, whereby alpha particles are released in the detector so as to produce pulses across the resistor 294. The detector 280 is also responsive to gamma rays of capture which are produced in the formations as a result of bombardment by neutrons from the source 276, so that pulses due to gamma rays of capture are also produced across the resistor 294.

These pulses are coupled through the condenser 300 to the amplifier 301, wherein they are amplified and are then coupled through the condenser 302 to the center conductor 303 of the cable 304. The coil 292 is connected between the conductors of the cable 304, ahead of the condenser 302. An amplifier 305 is provided at the earth's surface which amplifies the pulses transmitted over the cable 304, and the amplified pulses are transmitted through a pulse-shaping network 306 the output of which is connected through a condenser 307 to a master potentiometer 308. A control battery 309 is connected through the switch 310 to one side of the cable 304 and is connected through an isolating coil 311 to the other side of the cable 304. The pulses developed across the potentiometer 308 are impressed upon a pair of gate elements 315 and 316 and are also connected to the vertical plates 317 and 318 of a cathode ray oscillograph 319. The gate element 315 is adjusted to accept only those pulses which correspond to the gamma rays of capture which are intercepted by the detector 280, and the gate element 316 is adjusted to accept only those pulses resulting from the boron reaction in the layer 296 due to slow neutrons. In the illustrated embodiment of the system shown in FIG. 14, the source of reference particles 283 is not used for automatic control of the gate elements 315 and 316, so that the gate elements 315 and 316 are permanently adjusted to accept pulses within a predetermined range and the terminals thereof which correspond to the terminals 136 of the gate unit shown in FIG. 3, are connected to ground.

In the system shown in FIG. 14, the detector 280 responds continuously to slow neutrons and gamma rays of capture impressed thereon, so that the corresponding traces 325 and 326 are produced on the chart 327. However, the shutter member 284, normally covers the opening 282, so that the alpha particles released by the source 283, are prevented from entering the detector 280. When it is desired to check the sensitivity of the detector and determine whether any drift or variation in the system has occurred, the switch 310 is closed so that the DC potential of the battery 309 is connected through the coil 311, over the cable 304 and through the relay coil 393, so that the contacts 291 thereof are closed. When the contacts 291 are closed, a relatively large current from the battery 290 flows through the solonoid coil 289 with the result that the magnetic arm 285 is attracted and the shutter arrangement 284 is moved so as to uncover the opening 282. When this occurs, reference particles from the source 283 are impressed upon the detector 280 and this detector responds by producing reference pulses, the magnitude of which may be used to indicate the sensitivity of the detector.

In FIG. 15, there is shown the cathode ray tube picture which is produced on the face of the unit 319 when the switch 310 is open and no reference particles are impressed upon the detector. Thus, referring to this figure, the pulses due to slow neutrons are shown as the relatively large amplitude pulses 331 and the pulses due to gamma rays of capture are shown as the relatively small pulses 332, it being understood that the detector 280 is a gas-filled counter, as distinguished from a scintillation crystal, and therefore responds differently to gamma rays and slow neutrons, as will be readily understood by those skilled in the art. Most of the pulses 331 fall within the limits 333 and 334 established by the gate element 316, whereas most of the pulses 332 fall within the limits 335 and 336 established by the gate element 315. A calibration line 330 is provided on the face of the oscillograph 319 a fixed distance above the baseline 337 normally established by the cathode ray beam. In FIG. 16, there is shown the cathode ray tube picture which is produced when the switch 310 is closed. Referring to this figure, when the switch 310 is closed a large number of reference impulses 338 are produced on the cathode ray tube screen. The pulses 338 are of uniform amplitude and occur in great numbers so that they are readily visible and the amplitude thereof may be used as a calibration standard. Thus if the pulses 338 do not extend upward to the calibration line 330, as shown in FIG. 16, this condition indicates that the sensitivity of the detector 280 or the voltage supplied to this detector has drifted so that the system is no longer in calibration. Accordingly, the master potentiometer 308 may be adjusted so that the tops of the pulses 338 just coincide with the line 330. When this is done the system is in calibration and the thresholds of the gate elements 315 and 316 will be correct to accpet only those pulses which occur in the desired energy ranges. After calibration, the switch 310 is opened and the shutter element 284 is moved over the opening 282 so that the reference particles from the source 283 no longer enter the detector 280. It will be noted that the pulses produced by the reference particles may be of the same amplitude as the logging pulses which produce the curves 325 and 326, since the reference pulses are present only during calibration periods when the switch 310 is closed. While the source of reference particles 283 has been illustrated as inside the detector 280, it will be understood that the above described reference source, shutter and membrane arrangement may, if desired, be positioned outside the detector, as shown, for example in the system of FIG. 1. It will also be noted that by employing the membrane 279 the amplitude of the reference impulses due to particles from the source 283, which are relatively intense, may be made very small so that the reference impulses are of less amplitude than the smallest logging pulses. With this arrangement the reference particles may be permitted to enter the detector 280 continuously and the shutter element 284 is not required, it being understood that with small amplitude reference impulses the calibration line 330 would be relatively close to the baseline 337.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed as new and is desired to be secured by Letters Patent of the United States is:

1. A radioactivity well logging system for determining the oil-water interface in a fluid bearing formation traversed by a borehole, comprising a subsurface unit, means including a cable for lowering said unit into the borehole, a source of fast neutrons in said unit for bombarding with fast neutrons the formations traversed by the borehole as said unit is moved therewithin, fast neutron detector means in said unit for producing impulses corresponding to fast neutrons received from the formations the magnitude of which is related to the energy of the corresponding fast neutrons, a first pair of electrical selective networks for selecting only those impulses which fall within first and second narrow ranges of impulses height corresponding to predetermined related portions of the neutron cross section characteristic of the element carbon, a second pair of electrical selective networks for selecting only those impulses which fall within third and fourth narrow ranges of impulse heights, corresponding to predetermined related portions of the neutron cross section characteristic of the element oxygen, first ratio meter means for developing a first voltage proportional to the ratio of the outputs of said first pair of said selective electrical networks, second ratio meter means for developing a second voltage proportional to the ratio of the outputs of said second pair of said selective electrical networks, and means including third ratio meter means for producing an indication proportional to the ratio of said first and second voltages, whereby the oil-water interface in a fluid bearing formation may be detected.

2. In an apparatus for measuring frequency of arrival of incoming particles having characteristic energy, a detector responsive to said particles for producing a succession of impulses representing the frequency of arrival of said particles, the magnitude of said impulses representing said energy, a source of reference particles of known energy, shielding means normally preventing said reference particles from causing a response in said detector, means for varying said shielding means to permit said reference particles to cause a response in said detector, whereby said detector produces reference impulses in response to said reference particles, the magnitude of said reference impulses indicating the sensitivity of said detector, and means for controlling the magnitude of said first named impulses.

3. In an apparatus for measuring frequency of arrival of incoming particles having characteristic energy, a gas-filled detector responsive to said particles for producing a succession of impulses representing the frequency of arrival of said particles, the magnitude of said impulses representing said energy, a source of reference particles of known energy positioned inside said detector, shielding means inside said detector normally shielding said source to prevent said detector from responding to said reference particles, means controllable externally of said detector for varying said shielding means to permit said reference particles to cause a response in said detector, whereby said detector produces reference impulses in response to said reference particles, the magnitude of said reference impulses indicating the sensitivity of said detector, and means for controlling the magnitude of said first impulses.

4. In an apparatus for measuring frequency of arrival of incoming particles having characteristic energy, a detector responsive to said particles for producing a succession of impulses representing the frequency of arrival of said particles, the magnitude of said impulses representing said energy, a source of reference particles of known energy, means including a thin membrane positioned between said source and said detector for reducing the energy of reference particles emitted by said source in the direction of said detector, shielding means normally preventing reference particles traversing said membrane from causing a response in said detector, means for varying said shielding means to permit said detector to respond to reference particles traversing said membrane, whereby said detector prduces reference impulses in response to said reference particles, the magnitude of said reference impulses indicating the sensitivity of said detector, and means for controlling the magnitude of said first impulses.

5. In an apparatus for measuring frequency of arrival of incoming particles having characteristic energy, a detector responsive to said particles for producing a succession of impulses representing the frequency of arrival of said particles, the magnitude of said impulses representing said energy, a source of alpha particles of relatively high energy, means including a thin membrane positioned between said source and said detector for reducing the energy of alpha particles emitted by said source in the direction of said detector, shielding means normally preventing those alpha particles which traverse said membrane from causing a response in said detector, means for varying and shielding means to permit said detector to respond to alpha particles which traverse said membrane, whereby said detector produces reference impulses in response to said alpha particles, the magnitude of said reference impulses indicating the sensitivity of said detector, and means for controlling the magnitude of said first impulses.

6. In a radioactivity well logging system, a subsurface unit, means including a cable for lowering said unit into a borehole, a radiation detector in said unit for producing logging impulses corresponding to radiations incoming to said unit, the magnitude of said logging impulses representing the energy of said incoming radiations, a soruce of reference particles of known energy in said unit, shielding means in said unit normally preventing said detector from responding to reference particles from said source, means controllable over said cable for varying said shielding means to permit said reference particles to cause a response in said detector, whereby said detector produces reference impulses in response to said reference particles, the magnitude of said reference impulses indicating the sensitivity of said detector, means for transmitting over said cable to the earth's surface, means for recording the frequency of occurrence of said logging impulses, and means for determining the magnitude of said reference impulses thereby to provide an indication of the sensitivity of said detector.

7. In a radioactivity well logging system, a subsurface unit, means including a cable for lowering said unit into a borehole, a gas-filled radiation detector in said unit for producing logging impulses corresponding to radiations incoming to said unit, the magnitude of said logging impulses representing the energy of said incoming radiations, a source of alpha particles of relatively high energy in said unit, means including a thin membrane positioned between said source and said detector for reducing the energy of alpha particles emitted by said source in the direction of said detector, shielding means in said unit normally preventing those alpha particles which traverse said membrane from causing a response in said detector, means controllable over said cable for varying said shielding means to permit said detector to respond to alpha particles which traverse said membrane, whereby said detector produces reference impulses in response to said alpha particles, the magnitude of said reference impulses indicating the sensitivity of said detector, means for transmitting said logging impulses and said reference impulses over said cable to the earth's surface, means for recording the frequency of occurrence of said logging impulses, and means for determining the magnitude of said reference impulses, thereby to provide an indication of the sensitivity of said detector.

8. Apparatus for analyzing the properties of an unknown substance, comprising a means for generating a stream of neutrons substantially uncontaminated by gamma rays, said means being adapted and positioned to irradiate with neutrons a specimen of the substance to be analyzed, whereby neutrons and gamma rays are emitted by said substance as a result of interaction with said stream, a radiation detector comprising a scintillating phosphor, said detector also comprising in association with said phosphor a material operative to emit, upon undergoing interactions with neutrons, heavy charged particles having rest masses at least as great as that of a proton, said detector being positioned and disposed to receive and intercept neutrons and gamma rays emitted by said specimen in response to said stream of neutrons and to produce trains of electric impulses respectively representing interactions of gamma rays with said phosphor and interactions of heavy charged particles with said phosphor, the magnitudes of the pulses in said respective trains being substantially different, a magnitude-sensitive electrical selective network fed with said impulses from said detector, said network being operative to select and transmit only impulses of magnitudes within the range of magnitudes characteristic of impulses representing interactions of said phosphor with heavy charged particles, and means fed by the output of said selective network for measuring and indicating the frequency of occurrence of the impulses selectively transmitted by said selective network.

9. Apparatus for measuring a selected component of a complex radiation comprising a radiation detector having means responsive to said complex radiation for releasing two types of charged particles differing with respect to rest mass, the rest mass of one of such types being at least as great as that of a proton, said detector being adapted to produce electric output impulses representing interactions of said charged particles within said detector, the impulses corresponding to said heavy charged particles being substantially different in magnitude from those corresponding to said other type of charged particles, a magnitude-sensitive selective network fed by the output impulses from said detector and operative to select and transmit only output impulses having magnitudes within the range characteristic of said impulses corresponding to heavy charged particles, and means fed by said selectieve network for measuring and indicating the frequency of occurrence of the impulses selectively transmitted thereby.

10. Apparatus for measuring the thermal-neutron component of a complex radiation field comprising a radiation detector operative to produce electric output impulses responsively to interactions within said detector involving electrons, protons, and alpha particles, the impulses corresponding to each of said classes of particles being substantially different in magnitude from those corresponding to said other classes, said detector comprising a material characterized by emission of alpha particles responsively to interactions of such material with thermal neutrons, a magnitude-sensitive selective network fed by the output impulses from said detector and operative to select and transmit only such output impulses as have magnitudes lying within the range characteristic of impulses corresponding to alpha particles, and means fed by said selective network for measuring and indicating the frequency of occurrence of the impulses selectively transmitted thereby.

11. Apparatus for measuring incident radiation, comprising a radiation detector having a solid radiation-reactive element, operative to produce electric output impulses responsively to release therewithin of charged particles, said detector comprising means for interaction with said incident radiation operative to release within said detector charged particles of different rest masses, whereby the electric output impulses of said detector are characterized by different ranges of magnitude corresponding to the respective rest masses of the charged particles released within said detector, and a magnitude-selective network fed by the output impulses of said detector for measuring and indicating the frequency of occurrence of the impulses having magnitudes within a predetermined range.

12. Apparatus for analyzing the properties of an unknown substance, comprising a discharge tube having a target and means for bombarding the same with deuterons, said tube being operative to generate a stream of neutrons substantially uncontaminated by gamma rays, a radiation detector comprising means for generating electric output impulses of magnitudes dependent upon the character and energy level of intercepted radiation, and magnitude-responsive impulse-selecting means fed by said detector and operative selectively to transmit only such of said impulses as have magnitudes within a predetermined range.

13. Apparatus for analyzing the properties of an unknown substance, comprising a discharge tube having a target and means for bombarding the same with deuterons, said tube being operative to generate a stream of neutrons substantially uncontaminated by gamma rays, a radiation detector characterized by sensitivity to gamma rays and substantial insensitivity to neutrons, said discharge tube an detector being so disposed and positioned that said stream of neutrons can irradiate a specimen of the unknown substance and said detector can receive and intercept gamma rays emitted by said specimen, said radiation detector comprising means for generating electric output impulses of varying magnitudes representing the various energy levels of detected gamma rays, and magnitude-responsive impulse-selecting means fed by said detector and operative selectively to transmit only such of said output impulses from said detector as have magnitudes within a predetermined range.

14. Apparatus for analyzing the properties of an unknown substance, comprising a discharge tube having a target and means for bombarding the same with deuterons, said tube being operative to generate a stream of neutrons substantially uncontaminated by gamma rays, a radiation detector responsive both to gamma rays and neutrons and characterized by emission of electric output impulses produced responsively to intercepted radiation, the range of magnitudes of impulses produced by detected neutrons being substantially different from the range of magnitudes of impulses produced by detected gamma rays, and magnitude-responsive impulse-selecting means fed by said detector and operative separately to select and measure the frequency of occurrence of impulses having magnitudes within predetermined limits embraced wholly within one of said ranges.

15. The apparatus defined in claim 14 wherein said impulse-selecting means is provided also with means for selecting and measuring the frequency of occurrence of impulses having magnitudes within another set of limits within the other of said ranges.

16. Apparatus for determining radiation intensity comprising a crystal for emitting light flashes proportional to the frequency and energy of the radiation impinged thereupon, a photo cell responsive to said light flashes for emitting electrical pulses proportional thereto, means for amplifying said pulses, a gate circuit including biasing means for passing pulses above a given energy level and for blocking pulses below said level, and a rate meter variably responsive to the frequency of the pulses transmitted by the gate circuit.

17. Apparatus for determining radiation intensity as defined in claim 16 wherein a plurality of gate circuits is provided simultaneously operable and responsive respectively to pulses of different energy levels whereby to measure radiation of selectively different intensity levels.

18. Apparatus for determining radiation intensity as defined in claim 17 wherein a plurality of rate meters is provided, one for each gate circuit.

19. Apparatus for determining radiation intensity as defined in claim 16 wherein means is provided responsive to the position of the crystal for producing a record from the rate meter.

20. Apparatus for determining radiation intensity as defined in claim 18 wherein means is provided responsive to the position of the crystal for producing a plurality of records simultaneously from said rate meters.

21. Apparatus for determining radiation intensity as defined in claim 16 wherein means is provided for checking the action of the crystal and photo cell against a known standard.

22. Apparatus for determining radiation intensity as defined in claim 16 wherein temperature adjustment means is provided for controlling the action of the gate circuit.

23. Well logging apparatus for determining radiation intensity comprising a casing adapted to be lowered into a well bore hole, cable mechanism for controlling the position of the casing, a neutron source carried by the casing, a crystal carried by the casing for emitting light flashes proportional to the frequency and energy of radiation impinged thereupon, a photo cell responsive to said light flashes for emitting electrical pulses proportional thereto, means for amplifying said pulses, a gate circuit including biasing means for passing pulses above a given energy level and for blocking pulses below said level, a rate meter variably responsive to the frequency of the pulses transmitted by the gate circuit, and a recorder controlled by the rate meter and responsive to the position of the casing within the well bore hole.

* * * * *